US012683212B2

(12) United States Patent
Yamazaki et al.

(10) Patent No.: US 12,683,212 B2
(45) Date of Patent: Jul. 14, 2026

(54) CONTROL SYSTEM FOR SECONDARY BATTERY, CONTROL CIRCUIT, AND VEHICLE USING THE SAME

(71) Applicant: SEMICONDUCTOR ENERGY LABORATORY CO., LTD., Atsugi (JP)

(72) Inventors: Shunpei Yamazaki, Tokyo (JP); Yuto Yakubo, Kanagawa (JP); Takayuki Ikeda, Kanagawa (JP); Shoki Miyata, Kanagawa (JP); Hiroshi Kadoma, Kanagawa (JP); Kaori Ogita, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 578 days.

(21) Appl. No.: 17/914,498

(22) PCT Filed: Mar. 26, 2021

(86) PCT No.: PCT/IB2021/052507
§ 371 (c)(1),
(2) Date: Sep. 26, 2022

(87) PCT Pub. No.: WO2021/205275
PCT Pub. Date: Oct. 14, 2021

(65) Prior Publication Data
US 2023/0130800 A1 Apr. 27, 2023

(30) Foreign Application Priority Data
Apr. 10, 2020 (JP) ................................ 2020-070981

(51) Int. Cl.
H01M 10/615 (2014.01)
H01M 10/0525 (2010.01)
(Continued)

(52) U.S. Cl.
CPC ..... *H01M 10/615* (2015.04); *H01M 10/0525* (2013.01); *H01M 10/486* (2013.01);
(Continued)

(58) Field of Classification Search
None
See application file for complete search history.

(56) References Cited

U.S. PATENT DOCUMENTS 5,900,686 A 5/1999 Tabata et al.
6,037,726 A 3/2000 Tabata et al.
(Continued)

FOREIGN PATENT DOCUMENTS

CN 001105638 A 7/1995
CN 001838471 A 9/2006
(Continued)

OTHER PUBLICATIONS

International Search Report (Application No. PCT/IB2021/052507) dated Jun. 29, 2021.
(Continued)

*Primary Examiner* — Wyatt P McConnell
(74) *Attorney, Agent, or Firm* — NIXON PEABODY LLP; Jeffrey L. Costellia

(57) ABSTRACT

A control system for a secondary battery which is less affected by the ambient temperature by performing temperature control of the secondary battery is provided. A control system for a secondary battery which is less affected by the ambient temperature and in which a plurality of kinds of secondary batteries are used for temperature control is achieved and mounted on a vehicle. Specifically, when the ambient temperature is low, some of second secondary batteries are heated by self-heating of a first secondary battery. After the second secondary batteries are sufficiently heated, the rest of the second secondary batteries are heated (Continued)

in stages by self-heating of the some of the second secondary batteries whose temperature has been increased. Whether the some or all of the second secondary batteries are sufficiently heated can be confirmed if the temperatures of a plurality of temperature sensors provided in the second secondary batteries are within the operating temperature range of the second secondary batteries. For example, with the use of a temperature sensing terminal (T terminal) for a temperature sensor, a switch is closed when the internal temperature of the secondary batteries is out of the operating temperature range.

12 Claims, 14 Drawing Sheets

(51) Int. Cl.
  H01M 10/48 (2006.01)
  H01M 10/625 (2014.01)
  H01M 10/63 (2014.01)
(52) U.S. Cl.
  CPC ......... H01M 10/625 (2015.04); H01M 10/63 (2015.04); *H01M 2220/20* (2013.01)

(56) References Cited

U.S. PATENT DOCUMENTS

| | | | |
|---|---|---|---|
| 6,054,818 | A | 4/2000 | Tabata et al. |
| 7,927,740 | B2 | 4/2011 | Inagaki et al. |
| 8,283,878 | B2 | 10/2012 | Suyama |
| 10,741,834 | B2 | 8/2020 | Zhang et al. |
| 2002/0110736 | A1 | 8/2002 | Kweon. et al. |
| 2003/0104279 | A1 | 6/2003 | Miyazaki et al. |
| 2004/0142241 | A1 | 7/2004 | Nagayama |
| 2006/0216600 | A1* | 9/2006 | Inagaki ............... H01M 50/178 429/223 |
| 2006/0263690 | A1 | 11/2006 | Suhara et al. |
| 2007/0117014 | A1 | 5/2007 | Saito et al. |
| 2008/0241693 | A1 | 10/2008 | Fukuchi et al. |
| 2009/0087362 | A1 | 4/2009 | Sun et al. |
| 2009/0104532 | A1 | 4/2009 | Hosoya |
| 2010/0086854 | A1 | 4/2010 | Kumar. et al. |
| 2010/0247986 | A1 | 9/2010 | Toyama. et al. |
| 2011/0037420 | A1* | 2/2011 | Suyama ............... H01M 10/44 429/62 |
| 2013/0052534 | A1 | 2/2013 | Fujiki et al. |
| 2013/0323596 | A1 | 12/2013 | Morita et al. |
| 2014/0004393 | A1 | 1/2014 | Takahashi et al. |
| 2014/0212759 | A1 | 7/2014 | Blangero et al. |
| 2014/0272486 | A1 | 9/2014 | Kobayashi et al. |
| 2015/0008364 | A1 | 1/2015 | Endo |
| 2016/0006032 | A1 | 1/2016 | Paulsen et al. |
| 2016/0013478 | A1 | 1/2016 | Satow et al. |
| 2016/0099481 | A1 | 4/2016 | Akagawa et al. |
| 2016/0156032 | A1 | 6/2016 | Lee. et al. |
| 2016/0204432 | A1 | 7/2016 | Koshiba et al. |
| 2016/0268601 | A1 | 9/2016 | Paulsen et al. |
| 2016/0276659 | A1 | 9/2016 | Choi et al. |
| 2018/0013130 | A1 | 1/2018 | Ochiai et al. |
| 2018/0145317 | A1 | 5/2018 | Momma. et al. |
| 2018/0145368 | A1 | 5/2018 | Ochiai et al. |
| 2019/0245199 | A1 | 8/2019 | Zeng et al. |
| 2020/0176770 | A1 | 6/2020 | Takahashi et al. |
| 2020/0220173 | A1 | 7/2020 | Jo et al. |
| 2021/0083281 | A1 | 3/2021 | Mikami et al. |
| 2021/0249703 | A1 | 8/2021 | Ikeda et al. |
| 2021/0313571 | A1 | 10/2021 | Momma et al. |
| 2022/0131146 | A1 | 4/2022 | Saito et al. |
| 2022/0359870 | A1 | 11/2022 | Mikami et al. |
| 2025/0105282 | A1 | 3/2025 | Liu et al. |

FOREIGN PATENT DOCUMENTS

| | | | |
|---|---|---|---|
| CN | 101884133 | A | 11/2010 |
| CN | 105164847 | A | 12/2015 |
| CN | 105655554 | A | 6/2016 |
| CN | 113140726 | A | 7/2021 |
| EP | 0640507 | A | 3/1995 |
| EP | 1110801 | A | 6/2001 |
| EP | 1110802 | A | 6/2001 |
| EP | 3001496 | A | 3/2016 |
| JP | 2000-203842 | A | 7/2000 |
| JP | 2002-095182 | A | 3/2002 |
| JP | 2002-216760 | A | 8/2002 |
| JP | 2004-039523 | A | 2/2004 |
| JP | 2007-087909 | A | 4/2007 |
| JP | 2010-080407 | A | 4/2010 |
| JP | 2010-192185 | A | 9/2010 |
| JP | 2012-234749 | A | 11/2012 |
| JP | 2013-093239 | A | 5/2013 |
| JP | 2013-183523 | A | 9/2013 |
| JP | 2015-099722 | A | 5/2015 |
| JP | 2016-184476 | A | 10/2016 |
| KR | 2006-0103199 | A | 9/2006 |
| KR | 2006-0106336 | A | 10/2006 |
| KR | 2016-0010411 | A | 1/2016 |
| WO | WO-1993/023266 | | 11/1993 |
| WO | WO-2006/115342 | | 11/2006 |
| WO | WO-2010/092692 | | 8/2010 |
| WO | WO-2014/189082 | | 11/2014 |
| WO | WO-2020/012296 | | 1/2020 |

OTHER PUBLICATIONS

Written Opinion (Application No. PCT/IB2021/052507) dated Jun. 29, 2021.

Zhang. J et al., "Trace doping of multiple elements enables stable battery cycling of LiCoO2 at 4.6 V", Nature Energy, Jun. 17, 2019, vol. 4, pp. 594-603.

Hirooka.M et al., "Improvement of float charge durability for LiCoO2 electrodes under high voltage and storage temperature by suppressing 01-Phase transition", Journal of Power Sources, Jul. 1, 2020, vol. 463, p. 228127-1-228127-8, ELSEVIER.

Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, p. 1900355-1-1900355-11.

Okumura. T et al., "Correlation of lithium ion distribution and X-ray absorption near-edge structure in O3- and O2- lithium cobalt oxides from first-principle calculation", J. Mater. Chem. (Journal of Materials Chemistry), 2012, vol. 22, pp. 17340-17348.

Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.

WANG.Z et al., "EELS analysis of cation valence states and oxygen vacancies in magnetic oxides", MICRON, Oct. 1, 2000, vol. 31, No. 5, pp. 571-580, Elsvier.

Chung. K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.

Chen.Z et al., "Staging Phase Transitions in LixCoO2", J. Electrochem. Soc. (Journal of the Electrochemical Society), Oct. 29, 2002, vol. 149, No. 12, pp. A1604-A1609.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Zou.M et al., "Synthesis and Electrochemical Performance of High Voltage Cycling LiM0.05Co0.9502 as Cathode Material for Lithium Rechargeable Cells", Electrochemical and Solid-State Letters, Apr. 26, 2004, vol. 7, No. 7, pp. A176-A179.

Kim.Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.

(56)     References Cited

OTHER PUBLICATIONS

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.

Shim. J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.

Taguchi.N et al., "Characterization of MgO-coated-LiCoO2 particles by analytical transmission electron microscopy", Journal of Power Sources, Aug. 10, 2016, vol. 328, pp. 161-166, ELSEVIER.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.

Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.

Shao-horn. Y et al., "Probing Lithium and Vacancy Ordering in 03 Layered Lix CoO2 (x = 0.5) : An Electron Diffraction Study", J. Electrochem. Soc. (Journal of the Electrochemical Society), Feb. 6, 2003, vol. 150, No. 3, pp. A366-A373.

Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507-21.

Zhang. S et al., "Surface engineering of LiCoO2 by a multifunctional nanoshell for stable 4.6V electrochemical performance", Energy Storage Materials, Feb. 21, 2023, vol. 57, pp. 289-298.

Yano.A et al., "Capability and Reversibility of LiCoO2 during Charge/Discharge with O3/H1-3 Layered Structure Change", J. Electrochem. Soc. (Journal of the Electrochemical Society), May 11, 2021, vol. 168, No. 5, pp. 050517-1-050517-11.

* cited by examiner

<u>600</u>

601

610

602

613 601
610 611
608
606 605 604 603
605

602

609 607

<u>615</u>

613

600

614

<u>615</u>

613

617

616

FIG. 9A    950a
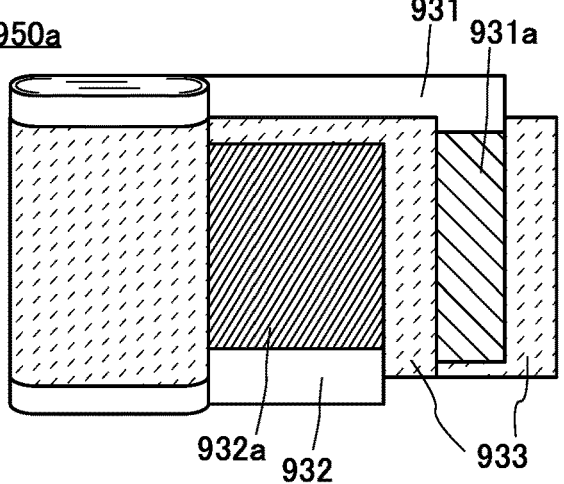
931   931a
932a   932    933
FIG. 9B   913
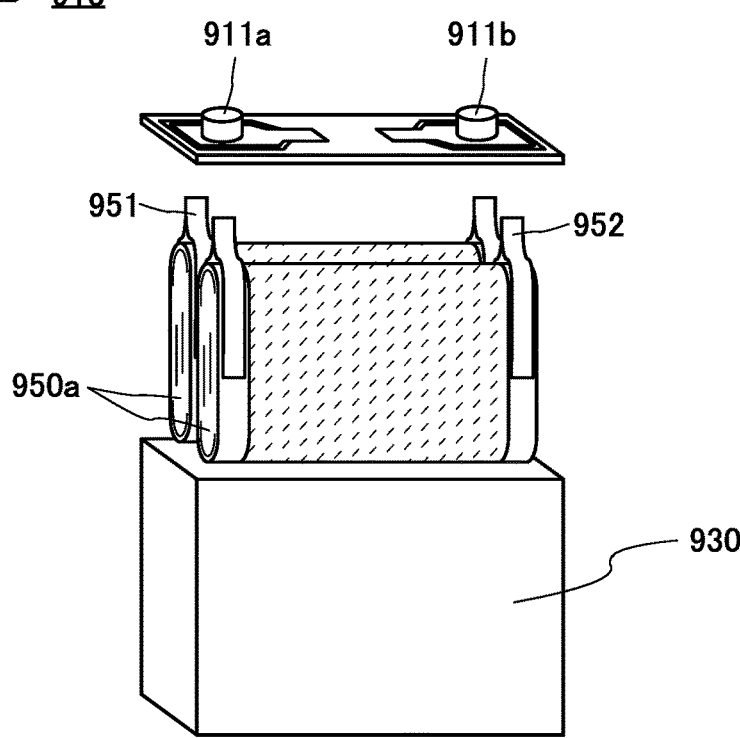
911a     911b
951     952
950a
930
FIG. 9C   913
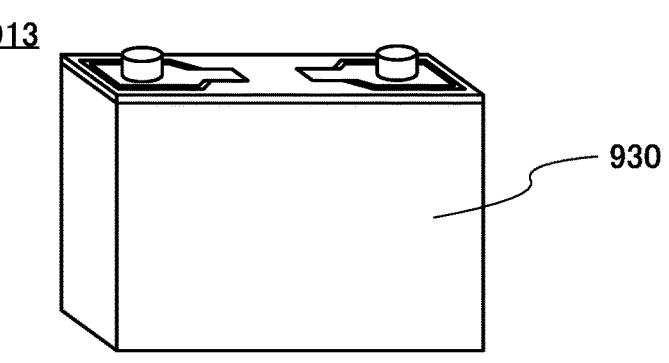
930

FIG. 11A
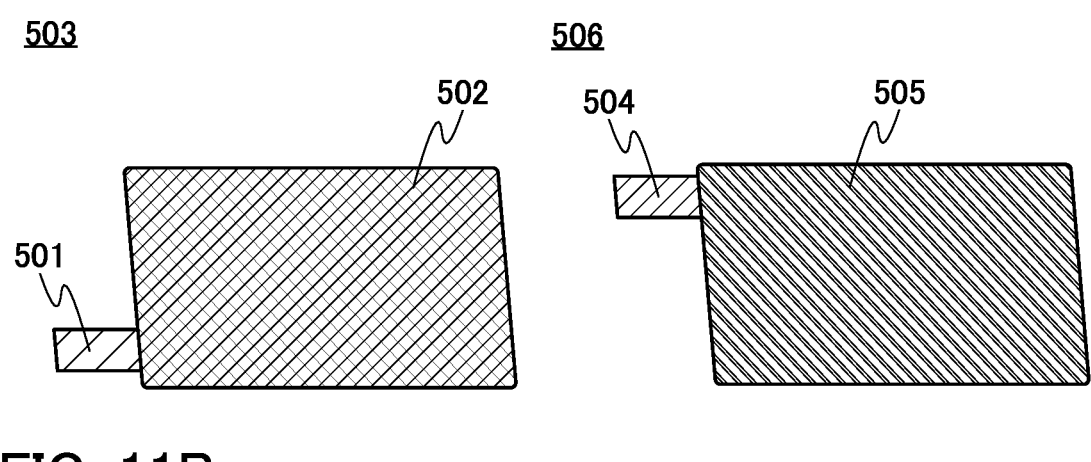
FIG. 11B
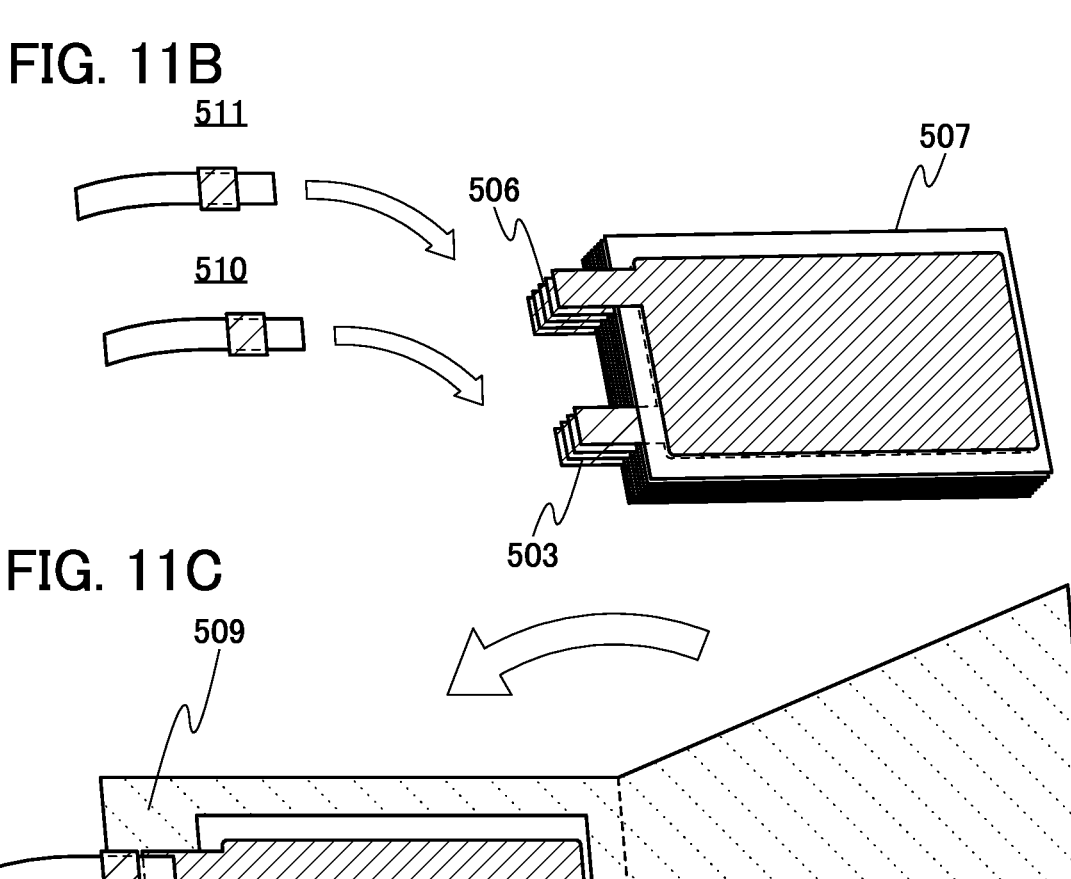
FIG. 11C

2001

2200

2002

2201

2003

2202

2004

2203

CONTROL SYSTEM FOR SECONDARY BATTERY, CONTROL CIRCUIT, AND VEHICLE USING THE SAME

TECHNICAL FIELD

One embodiment of the present invention relates to a secondary battery and a manufacturing method thereof. Furthermore, one embodiment of the present invention relates to a vehicle and the like each including a secondary battery.

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof.

Note that electronic devices in this specification mean all devices including power storage devices, and electro-optical devices including power storage devices, information terminal devices including power storage devices are all electronic devices.

Note that in this specification, a power storage device refers to every element and device having a function of storing power. For example, a power storage device (also referred to as a secondary battery) of a lithium-ion secondary battery, a lithium-ion capacitor, and an electric double layer capacitor are included.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, and laptop computers, portable music players, digital cameras, medical equipment, and next-generation clean energy vehicles such as hybrid electric vehicles (HVs), electric vehicles (EVs), and plug-in hybrid electric vehicles (PHVs), and the lithium-ion secondary batteries are essential as rechargeable energy supply sources for today's information society.

Lithium-ion secondary batteries have a problem in charging and discharging at low temperatures or high temperatures. In particular, secondary batteries, which are power storage means utilizing chemical reaction, cannot easily show their full performance at low temperatures below freezing. At high temperatures, the lifetime of a secondary battery might be shortened and an abnormality might occur in a lithium-ion secondary battery.

Secondary batteries capable of showing stable performance regardless of the operating environment are desired.

Patent Document 1 discloses a technique of a protective circuit that controls the amount of charging current according to the ambient temperature, in which the amount of charging current is reduced with the use of temperature characteristics of a transistor that uses an oxide semiconductor (hereinafter referred to as an OS transistor) when the temperature is low.

REFERENCE

Patent Document

[Patent Document 1] WO2020/012296

SUMMARY OF THE INVENTION

Problems to be Solved by the Invention

An object is to provide a control system for a secondary battery which is less affected by the ambient temperature by performing temperature control of the secondary battery. Another object is to provide a monitor system for a secondary battery with high safety.

Another object is to ensure safety by detecting an abnormality of a secondary battery, for example, by detecting a phenomenon that lowers the safety of the secondary battery early and giving a warning to a user.

Means for Solving the Problems

A control system for a secondary battery which is less affected by the ambient temperature and in which a plurality of kinds of secondary batteries are used for temperature control is achieved and mounted on a vehicle. Specifically, when the ambient temperature is low, some of second secondary batteries are heated by electric power of a first secondary battery. After the second secondary batteries are sufficiently heated, the rest of the second secondary batteries are heated in stages by electric power of the some of the second secondary batteries whose temperature has been increased. Whether the some or all of the second secondary batteries are sufficiently heated can be confirmed if the temperatures of a plurality of temperature sensors provided in the second secondary batteries are within the operating temperature range of the second secondary batteries. For example, with the use of a temperature sensing terminal (T terminal) for a temperature sensor, a switch is closed when the internal temperature of the secondary batteries is out of the operating temperature range.

The first secondary battery itself becomes a heat source warming some of the second secondary batteries. Thus, the first secondary battery is for low temperature, and a secondary battery of the kind that can be discharged at low temperature is used. After the temperatures of the some of the second secondary batteries are increased by self-heating of the low-temperature secondary battery, the some of the second secondary batteries that have been capable of being discharged by the temperature increase serve as a heat source warming the rest of the secondary batteries.

The lower limit of the operating temperature range of the first secondary battery is lower than the lower limit of the operating temperature range of the second secondary batteries. Different kinds of secondary batteries are used for the first secondary battery and the second secondary batteries. For example, electrolytes differ between the first secondary battery and the second secondary batteries. A structure in which a semi-solid-state battery is used for the first secondary battery and an electrolyte is used for the second secondary batteries may be used.

For safe use of a secondary battery, there are an operating temperature range and a preservation temperature range depending on the material or structure used. The preservation temperature range is wider than the operating temperature range. In this specification, the operating temperature range refers to the temperature range suitable for use of the secondary battery, that is, the temperature range in normal operation (in discharging). The operating temperature range in discharging might be different from the operating temperature range in charging. The preservation temperature range is the suitable temperature range in which the degree of deterioration of the secondary battery can be lowered when a charging control circuit is stopped while neither discharging nor charging is performed.

A structure disclosed in this specification is a vehicle including: a first lithium-ion secondary battery having an operating temperature range that is a first temperature range; a second lithium-ion secondary battery having an operating temperature range that is a second temperature range including the upper limit of the first temperature range; and a temperature sensor sensing a temperature of the second lithium-ion secondary. The lower limit of the first temperature range is lower than the lower limit of the second temperature range. The vehicle includes a control circuit that brings the temperature of the second lithium-ion secondary battery within the second temperature range by heating with self-heating of the first lithium-ion secondary battery when the temperature of the temperature sensor is lower than the second temperature range.

In the above structure, the lower limit of the first temperature range is at least lower than 25° C. and the upper limit of the second temperature range is at least higher than the first temperature range.

A secondary battery with an operating temperature range higher than or equal to −40° C. and lower than or equal to 85° C. can be said to be ideal; however, a secondary battery that is discharged or charged at temperature higher than or equal to −40° C. and lower than or equal to 85° C. is difficult to achieve in consideration of a material (specifically an electrolyte) used. In view of the above, according to the present invention, a control system for a secondary battery which is less affected by the ambient temperature can be achieved with the use of a plurality of kinds of secondary batteries with different operating temperature ranges. For example, a first lithium-ion secondary battery with an operating temperature range higher than or equal to −40° C. and lower than 25° C. and a second lithium-ion secondary battery with an operating temperature range higher than or equal to 0° C. and lower than or equal to 85° C., preferably higher than or equal to 25° C. and lower than or equal to 85° C. are used. The first lithium-ion secondary battery with an operating temperature range higher than or equal to −40° C. and lower than 25° C. can be referred to as a low-temperature secondary battery, and functions as a power source for heating of the second lithium-ion secondary battery at the time of low temperatures. The low-temperature secondary battery has an auxiliary function and accordingly the second lithium-ion secondary battery has higher capacity and functions as a main power source (a main battery).

In each of the above structures, the first lithium-ion secondary battery may be an all-solid-state battery or a semi-solid-state battery.

In this specification and the like, a semi-solid-state battery refers to a battery in which at least one of an electrolyte layer, a positive electrode, and a negative electrode includes a semi-solid-state material. The term "semi-solid-state" here does not mean that the proportion of a solid-state material is 50%. The term "semi-solid-state" means having properties of a solid, such as a small volume change, and also having some of properties close to those of a liquid, such as flexibility. A single material or a plurality of materials can be used as long as the above properties are satisfied. For example, a porous solid-state material infiltrated with a liquid material may be used. For example, a polymer electrolyte secondary battery may be referred to as a semi-solid-state battery. Polymer electrolyte secondary batteries include a dry (or intrinsic) polymer electrolyte battery and a polymer gel electrolyte battery.

A control system for a secondary battery disclosed in this specification includes: a first lithium-ion secondary battery; a second lithium-ion secondary battery having an operating temperature range different from an operating temperature range of the first lithium-ion secondary battery; a heating means heating the second lithium-ion secondary battery; a monitor circuit monitoring the voltage and the temperature of the second lithium-ion secondary battery; a control circuit electrically connected to the monitor circuit; and a switch between the heating means and the first lithium-ion secondary battery. The switch is controlled by the control circuit.

In the above control system, the monitor circuit or the control circuit preferably includes a protective circuit. The protective circuit includes a disconnecting switch or diode and prevents overdischarge, overcharge, or overcurrent. The protective circuit may have a function of detecting an abnormality of a micro-short circuit. Specifically, the protective circuit detecting an abnormality of a micro-short circuit has a function of detecting an instant potential change (here, a potential decrease) due to a micro-short circuit in a secondary battery during charging and discharging by sampling (obtaining) a potential between the positive electrode and the negative electrode of the secondary battery at fixed intervals and comparing the sampled potential with a post-sampling potential between the positive electrode and the negative electrode.

A micro-short circuit refers to a minute short circuit caused in a secondary battery. A micro-short circuit refers to not a state where the positive electrode and the negative electrode of a secondary battery are short-circuited so that charging and discharging are impossible, but a phenomenon in which a short-circuit current flows through a minute short-circuit portion for a short period. A micro-short circuit is presumably caused in the following manner: a plurality of charges and discharges cause precipitation of a metal element such as lithium or cobalt in the battery, the growth of the precipitate causes a local current concentration in part of a positive electrode and part of a negative electrode, and the function of a separator partially stops or a by-product is generated.

The plurality of secondary batteries each include a monitor circuit. The monitor circuit of the secondary battery monitors a voltage or a temperature of the secondary battery. The monitor circuit of the secondary battery is electrically connected to the control circuit, and the control circuit includes a charging control circuit. When the voltage or the temperature exceeds the upper limit value or falls below the lower limit value, charging current or discharging current is limited. The control circuit includes a circuit that determines charging conditions of the secondary battery. A CPU (Central Processor Unit) or a GPU (Graphics Processing Unit) is used for the control circuit. A chip in which a CPU and a GPU are integrated, an APU (Accelerated Processing Unit), can also be used for the control circuit. An AI (an IC incorporating a system (also referred to as an inference chip)) may be used. The IC incorporating an AI system is sometimes referred to as a circuit performing neural network processing (a microprocessor).

Preferably, at low temperatures below freezing, the control circuit changes the normal mode to the preheating mode and increases the temperature of the secondary battery by the heating means until the temperature is brought within the operating temperature range.

The monitor circuit may include the protective circuit. The control circuit may also include the protective circuit. The charging control circuit may be an IC chip different from the control circuit. The charging control circuit may be formed with only OS transistors or only part of the structure may be formed with OS transistors. The disconnecting switch of the protective circuit may be formed with a transistor including single crystal silicon, for example. The control circuit may be formed using a material containing Ge (germanium), SiGe (silicon germanium), GaAs (gallium arsenide), GaAlAs (gallium aluminum arsenide), InP (indium phosphide), SiC (silicon carbide), ZnSe (zinc selenide), GaN (gallium nitride), or GaOx (gallium oxide; x is a real number greater than 0). A structure using silicon whose effective mass is controlled by applying stress to the crystal lattice and changing the lattice spacing may be employed.

A heating means may also be provided. The structure is a vehicle including: a first lithium-ion secondary battery having an operating temperature range that is a first temperature range; a second lithium-ion secondary battery having an operating temperature range that is a second temperature range including the upper limit of the first temperature range; a temperature sensor sensing a temperature of the second lithium-ion secondary battery; and a heating means heating the second lithium-ion secondary battery. The heating means is electrically connected to the first lithium-ion secondary battery. The lower limit of the first temperature range is lower than the lower limit of the second temperature range. The vehicle includes a control circuit that brings the temperature of the second lithium-ion secondary battery within the second temperature range by heating with the heating means using the first lithium-ion secondary battery as a power source when the temperature of the temperature sensor is lower than the second temperature range.

In another structure of the present invention, three or more secondary batteries are successively heated by a heater. The structure is a vehicle including: a first lithium-ion secondary battery having an operating temperature range that is a first temperature range; a second lithium-ion secondary battery having an operating temperature range that is a second temperature range including the upper limit of the first temperature range; a first temperature sensor sensing a temperature of the second lithium-ion secondary battery; a first heating means heating the second lithium-ion secondary battery; a third lithium-ion secondary battery having an operating temperature range that is the second temperature range; a second temperature sensor sensing a temperature of the third lithium-ion secondary battery; and a second heating means heating the third lithium-ion secondary battery. The first heating means is electrically connected to the first lithium-ion secondary battery. The second heating means is electrically connected to the second lithium-ion secondary battery. The lower limit of the first temperature range is lower than the lower limit of the second temperature range. The vehicle includes a control circuit that brings the temperature of the second lithium-ion secondary battery within the second temperature range by heating with the first heating means when the temperature of the second secondary battery is lower than the second temperature range, so that the second secondary battery functions as a power source of the second heating means heating the third lithium-ion secondary battery.

In the above structure, the first lithium-ion secondary battery preferably includes a control circuit functioning as a power source for heating the second lithium-ion secondary battery.

Preferably, in each of the above structures, the melting point of an electrolyte of the first lithium-ion secondary battery is lower than or equal to −40° C. and at least a main component of the electrolyte of the first lithium-ion secondary battery includes a component with a melting point lower than or equal to −40° C.

Preferably, in each of the above structures, the viscosity of an electrolyte of the second lithium-ion secondary battery is lower than the viscosity of the electrolyte of the first lithium-ion secondary battery.

When a heating means heating a secondary battery is provided, it is possible to use any or more than one of an electrothermal heater structure using electric heat by a resistance heating method in which current flows through a resistor such as a nichrome wire or ceramic and a heater structure by a dielectric heating method in which a heater is contained in a catalyst and electrical energy is used for heating. For example, a ceramic heater or a film heater is placed at or near a secondary battery. A structure in which a secondary battery is interposed between or surrounded by a plurality of heating means may be employed.

Effect of the Invention

The low-temperature secondary battery is prepared as an auxiliary power source and the heating means heating some of the secondary batteries as the main power sources is provided, whereby the control system for a secondary battery which is less affected by the ambient temperature can be provided. Even when the temperature outside the vehicle is higher than or equal to −40° C. and lower than 25° C., the low-temperature secondary battery heats some of the secondary batteries as the main power sources, which can drive the vehicle. Even when the temperature is higher than or equal to 25° C. and lower than or equal to 85° C., the secondary batteries as the main power sources can drive the vehicle.

Since the secondary batteries each include a temperature sensor, an abnormality of the secondary batteries can be detected, e.g., a phenomenon that lowers the safety of the secondary batteries can be early detected, and a warning can be given to the user, which ensures safety.

BRIEF DESCRIPTION OF THE DRAWINGS

FIG. 9A is a perspective view of a wound body, FIG. 9B is a view illustrating an internal structure of a secondary battery, and FIG. 9C is a view illustrating the appearance of a secondary battery.

FIG. 11A is a view illustrating a positive electrode and a negative electrode, FIG. 11B is a view illustrating a state where electrode tabs are attached, and FIG. 11C is a view illustrating a state where electrodes are covered with an external body.

MODE FOR CARRYING OUT THE INVENTION

Embodiments of the present invention are described in detail below with reference to the drawings. Note that the present invention is not limited to the following descriptions, and it is readily understood by those skilled in the art that modes and details of the present invention can be modified in various ways. In addition, the present invention should not be construed as being limited to the descriptions of the embodiments below.

Embodiment 1

Hereinafter, this embodiment shows the following example: at the time of low temperatures, the temperature of a secondary battery 11a is increased with the use of a low-temperature secondary battery 10; after the temperature has been increased, the temperature of a secondary battery 11b is increased with the use of the secondary battery 11a; and the temperatures of secondary batteries 11c, 11d, and 11e are sequentially increased.

Figure 1:
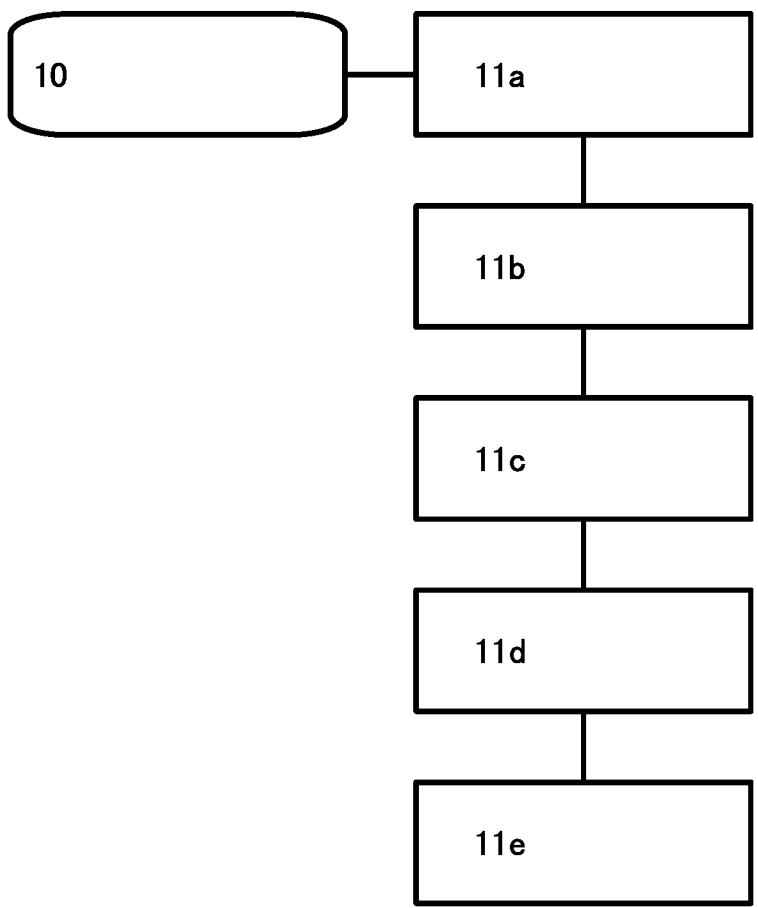
FIG. 1 is a conceptual diagram illustrating one embodiment of the present invention.

FIG. 1 is a conceptual diagram illustrating one embodiment of the present invention.

The low-temperature secondary battery 10 is an auxiliary power source and the secondary batteries 11a, 11b, 11c, 11d, and 11e connected in series are the main power sources. Although not illustrated, monitor circuits including temperature sensors are included in the respective secondary batteries. The secondary batteries 11a, 11b, 11c, 11d, and 11e are secondary batteries having the same structure. Although FIG. 1 shows the example including five secondary batteries in total for easy description, the number of secondary batteries is not particularly limited. A plurality of secondary batteries used for a vehicle are connected in series or in parallel, and 100 or more and up to approximately 6500 secondary batteries are mounted on one vehicle. Much more secondary batteries are mounted on a heavy vehicle such as a truck or a bus.

The viscosity of an electrolyte used for the secondary batteries 11a, 11b, 11c, 11d, and 11e is preferably lower than the viscosity of an electrolyte used for the low-temperature secondary battery 10. The viscosity can be measured with a rotational viscometer.

The low-temperature secondary battery 10 is preferably a lithium-ion secondary battery having an operating temperature range whose lower limit is higher than or equal to −40° C. and lower than 25° C., preferably higher than or equal to −40° C. and lower than 0° C. As the electrolyte, specifically, a mixture of ethylene carbonate (EC) as a cyclic carbonate material and dimethyl carbonate (DMC) or ethyl methyl carbonate (EMC) as a chain carbonate material can be used. A secondary battery using an electrolyte of this combination is confirmed to be able to be charged and discharged at 0.1 C at −40° C. Instead of EC, polypropylene carbonate (PC) or fluoroethylene carbonate (FEC) may be used. Such cyclic carbonates may be mixed at a given ratio and used. Alternatively, a semi-solid-state battery or an all-solid-state battery may be used as the low-temperature secondary battery 10.

Note that ethylene carbonate (EC) has a melting point of 38° C., a boiling point of 238° C., and a viscosity (a viscosity at 40° C.) of 1.9 cP (at 40° C.). Dimethyl carbonate (DMC) has a melting point of 3° C., a boiling point of 90° C., and a viscosity of 0.59 cP. Ethyl methyl carbonate (EMC) has a melting point of −54° C., a boiling point of 107° C., and a viscosity of 0.65 cP. Polypropylene carbonate (PC) has a melting point of −50° C., a boiling point of 242° C., and a viscosity of 2.5 cP. Fluoroethylene carbonate (FEC) has a melting point of 17° C. and a boiling point of 210° C. At least the main component of an electrolyte layer used for the low-temperature secondary battery 10 is preferably composed of a component having a melting point lower than or equal to −40° C. The main component indicates the component at 1 wt % or more of the whole electrolyte layer, and a component at lower than 1 wt % is regarded as an impurity. For the composition of a solvent used for the electrolyte layer, NMR (nuclear magnetic resonance) or GC-MS (gas chromatography mass spectrometry) is employed. More desirably, at least one electrolyte (also referred to as a solvent or an electrolytic solution) used for the low-temperature secondary battery is EMC, which has a melting point lower than or equal to −40° C.

Furthermore, the electrolyte layer may contain an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile. The concentration of the additive agent in the whole solvent is, for example, higher than or equal to 0.1 wt % and lower than or equal to 5 wt %.

Preferably, the secondary batteries 11a, 11b, 11c, 11d, and 11e are each a lithium-ion secondary battery having a wide operating temperature range including high temperature. Specifically, as the electrolyte, a mixed solution of diethyl carbonate (DEC) and ethylene carbonate (EC) is used. Diethyl carbonate (DEC) has a melting point of −43° C., a boiling point of 127° C., and a viscosity of 0.75 cP. Lithium-ion secondary batteries that have high capacity and hardly deteriorate at high temperature while their characteristics are degraded when used at temperatures below freezing are employed as the secondary batteries 11a, 11b, 11c, 11d, and 11e.

The operating temperature range of the low-temperature secondary battery 10 at least partly overlaps with the operating temperature range of the secondary batteries 11a, 11b, 11c, 11d, and 11e.

There has been a conventional system in which an electric vehicle is connected to an external charging station and all secondary batteries are heated at the same time during charging. There has also been a system in which the temperatures of all secondary batteries of an electric vehicle are adjusted to be constant at the same time.

In this embodiment, at the time of low temperatures, some of the main power sources, for example, only the secondary battery 11a is heated by the low-temperature secondary battery 10. After heating, the secondary battery 11a which has become operable by heating is used as a heat power source to heat the secondary battery 11b. In this manner, the rest of the secondary batteries are sequentially made operable, whereby all the secondary batteries are successively heated. To use self-heating of the low-temperature secondary battery 10 for heating, the low-temperature secondary battery 10 is preferably placed close to the secondary battery 11a. To use the secondary battery 11a as a heat power source for heating of the secondary battery 11b, the secondary battery 11a and the secondary battery 11b are preferably placed close to each other. Regardless of their placement in FIG. 1, there is no particular limitation; actually, the low-temperature secondary battery 10 may be placed below the bottom surface of the secondary battery 11a and the secondary battery 11b may be placed in contact with a side surface of the secondary battery 11a. A member with high thermal conductivity may be placed between secondary batteries to provide the structure with higher thermal conductance. For example, heat can be sufficiently conducted even between secondary batteries slightly apart from each other with the use of a material with high thermal conductivity, such as copper or aluminum, for housings of the secondary batteries.

A secondary battery group of a vehicle is controlled by a control circuit including a CPU. The voltage of each secondary battery is monitored, and a charging condition in charging and a discharging condition in discharging are regulated. The control circuit includes a protective circuit which prevents overcharge or overdischarge. In this embodiment, a temperature sensor is included in each secondary battery, whereby a system can monitor temperature in addition to electrical characteristics of the voltage and control the temperature of each secondary battery.

Figure 2:
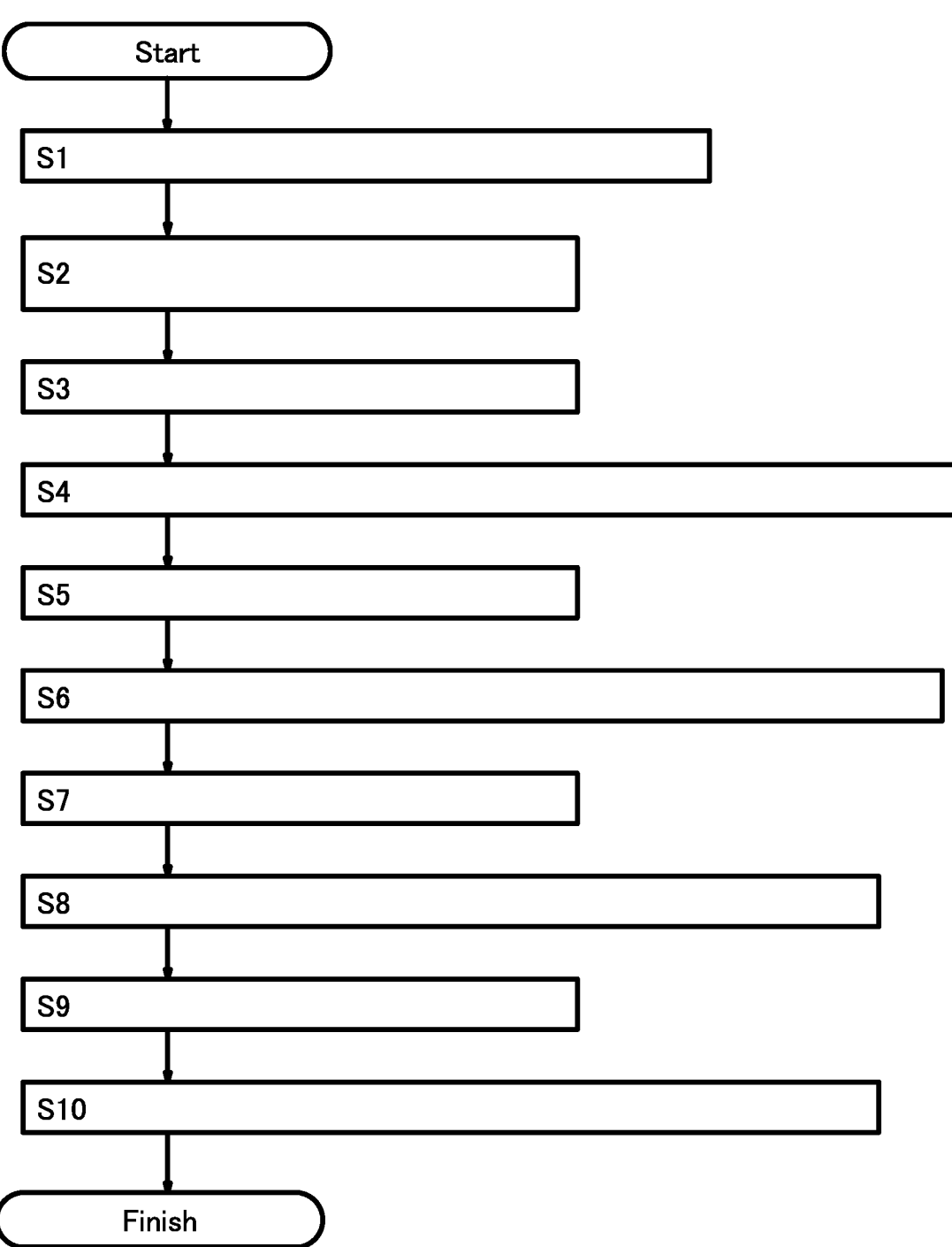
FIG. 2 is a flow chart illustrating one embodiment of the present invention.

A sequence of a preheating mode of a temperature control system for the secondary battery at the time of low temperatures is described below with reference to an example of a flow chart in FIG. 2.

First, the temperature is measured with a temperature sensor provided in the secondary battery 11a. When the temperature is lower than the operating range of the secondary battery 11a, the control circuit stops charging and discharging. The control circuit changes the normal mode to the preheating mode to start the preheating mode.

Electric conduction enables the low-temperature secondary battery 10 to function as a heat source, and a switch that changes the on/off of electric conduction through a low-temperature secondary battery 101 can be also referred to as a temperature control circuit. The control circuit controls the switch. When the temperature of the secondary battery 11a is low, the secondary battery 11a is heated with the use of self-heating of the low-temperature secondary battery 10. (S1)

Then, the secondary battery 11a reaches the operable temperature owing to the heat (self-heating) of the low-temperature secondary battery 10. (S2)

Then, heating using the secondary battery 11a as a heat source is performed by the electric conduction of the secondary battery 11a. (S3)

Then, the secondary battery 11b reaches the operable temperature owing to the heat of the secondary battery 11a. (S4)

Then, heating using the secondary battery 11b as a heat source is performed. (S5)

Then, the secondary battery 11c reaches the operable temperature owing to the heat of the secondary battery 11b. (S6)

Then, heating using the secondary battery 11c as a heat source is performed. (S7)

Then, the secondary battery 11d reaches the operable temperature owing to the heat of the secondary battery 11c. (S8)

Then, heating using the secondary battery 11d as a heat source is performed. (S9)

Then, the secondary battery 11e reaches the operable temperature owing to the heat of the secondary battery 11d. (S10)

Through the above steps, even at low temperature, the sequential heating enables the secondary batteries 11a, 11b, 11c, 11d, and 11e to be efficiently heated to the operable temperature. When all the secondary batteries 11a, 11b, 11c, 11d, and 11e have been heated to the operable temperature, the control circuit changes the preheating mode to the normal mode and finishes the preheating mode.

FIG. 1 shows the example of six secondary batteries in total of one low-temperature secondary battery and five secondary batteries connected in series. However, there is no particular limitation on the number of secondary batteries as long as the number is two or more; a structure of three secondary batteries in total of one low-temperature secondary battery and two secondary batteries connected in parallel can be employed.

Embodiment 2

In this embodiment, an example of using a heater is described. With the use of a heater, the low-temperature secondary battery 101 can be placed on a dashboard, which is less affected by the external environment, and secondary batteries 102a, 102b, 102c, 102d, and 102e can be placed under a vehicle interior, specifically under a seat; thus, they can be placed apart from each other. The main power sources which increase in weight are preferably placed under a vehicle interior when high priority is given to the weight balance in the vehicle. Although the main power sources in the placement under a vehicle interior are near the ground and near the outside air and accordingly tend to be cooled in cold areas, a motor can be stably started owing to the low-temperature secondary battery 101 placed on the dashboard which is less affected by the ambient air. In the example described below, the temperature of the secondary battery 102a is increased with the use of the low-temperature secondary battery 101 at the time of low temperatures, and after the temperature has been increased, the temperature of the secondary battery 102b is increased with the use of the secondary battery 102a.

Figure 3:
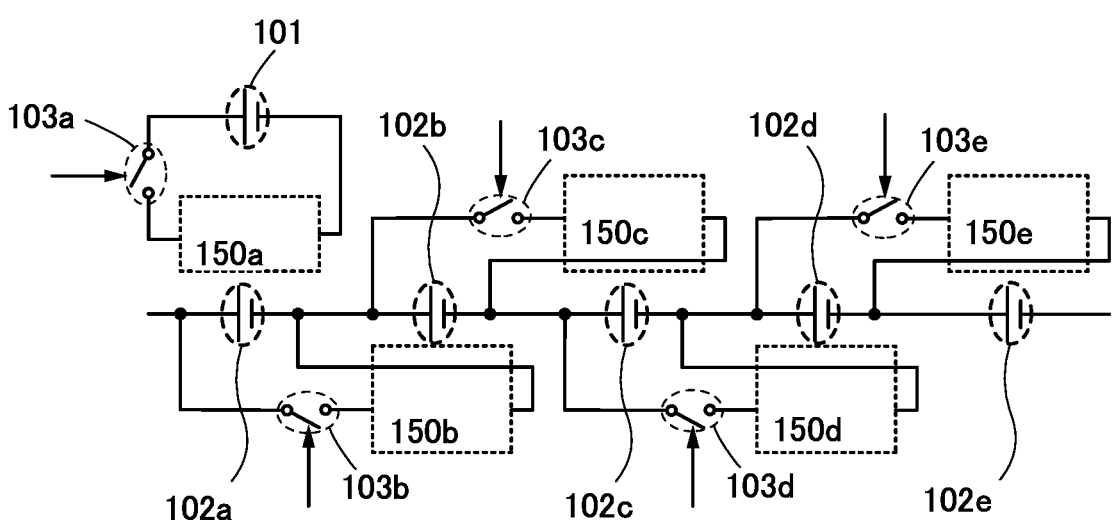
FIG. 3 is a conceptual diagram illustrating one embodiment of the present invention.

FIG. 3 is a conceptual diagram illustrating one embodiment of the present invention.

The low-temperature secondary battery 101 is an auxiliary power source and the secondary batteries 102a, 102b, 102c, 102d, and 102e connected in series are the main power sources. Although not illustrated, monitor circuits including temperature sensors are included in the respective secondary batteries. Heaters 150a, 150b, 150c, 150d, and 150e which heat the secondary batteries 102a, 102b, 102c, 102d, and 102e are included. The secondary batteries 102a, 102b, 102c, 102d, and 102e are secondary batteries having the same structure. Although FIG. 3 shows the example including five secondary batteries in total for easy description, the number of secondary batteries is not particularly limited. A plurality of secondary batteries used for a vehicle are connected in series or in parallel, and 100 or more and up to approximately 6500 secondary batteries are mounted on one vehicle. Much more secondary batteries are mounted on a heavy vehicle such as a truck or a bus.

The viscosity of an electrolyte used for the secondary batteries 102a, 102b, 102c, 102d, and 102e is preferably lower than the viscosity of an electrolyte used for the low-temperature secondary battery 101.

The low-temperature secondary battery 101 is preferably a lithium-ion secondary battery having an operating temperature range whose lower limit is higher than or equal to −40° C. and lower than 25° C., preferably higher than or equal to −40° C. and lower than 0° C. As the electrolyte, specifically, a mixture of ethylene carbonate (EC) as a cyclic carbonate material and dimethyl carbonate (DMC) or ethyl methyl carbonate (EMC) as a chain carbonate material can be used. A secondary battery using an electrolyte of this combination is confirmed to be able to be charged and discharged at 0.1 C at −40° C. Instead of EC, polypropylene carbonate (PC) or fluoroethylene carbonate (FEC) may be used. Such cyclic carbonates may be mixed at a given ratio and used. Alternatively, a semi-solid-state battery or an all-solid-state battery may be used as the low-temperature secondary battery 101.

Note that ethylene carbonate (EC) has a melting point of 38° C., a boiling point of 238° C., and a viscosity (a viscosity at 40° C.) of 1.9 cP. Dimethyl carbonate (DMC) has a melting point of 3° C., a boiling point of 90° C., and a viscosity of 0.59 cP. Ethyl methyl carbonate (EMC) has a melting point of −54° C., a boiling point of 107° C., and a viscosity of 0.65 cP. Polypropylene carbonate (PC) has a melting point of −50° C., a boiling point of 242° C., and a viscosity of 2.5 cP. Fluoroethylene carbonate (FEC) has a melting point of 17° C. and a boiling point of 210° C. At least the main component of an electrolyte layer used for the low-temperature secondary battery is preferably composed of a component having a melting point lower than or equal to −40° C.

Furthermore, the electrolyte layer may contain an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile. The concentration of the additive agent in the whole solvent is, for example, higher than or equal to 0.1 wt % and lower than or equal to 5 wt %.

Preferably, the secondary batteries 102a, 102b, 102c, 102d, and 102e are each a lithium-ion secondary battery having a wide operating temperature range including high temperature. Specifically, as the electrolyte, a mixed solution of diethyl carbonate (DEC) and ethylene carbonate (EC) is used. Diethyl carbonate (DEC) has a melting point of −43° C., a boiling point of 127° C., and a viscosity of 0.75 cP. Lithium-ion secondary batteries that have high capacity and hardly deteriorate at high temperature while their characteristics are degraded when used at temperatures below freezing are employed as the secondary batteries 102a, 102b, 102c, 102d, and 102e.

The operating temperature range of the low-temperature secondary battery 101 at least partly overlaps with the operating temperature range of the secondary batteries 102a, 102b, 102c, 102d, and 102e.

There has been a conventional system in which an electric vehicle is connected to an external charging station and all secondary batteries are heated at the same time during charging. There has also been a system in which the temperatures of all secondary batteries of an electric vehicle are adjusted to be constant at the same time.

In this embodiment, at the time of low temperatures, some of the main power sources, for example, only the secondary battery 102a is heated by the heater 150a. After heating, a switch 103a is brought into an off state, so that the heater 150a is in a heating stop state. Next, the secondary battery 102a which has become operable by heating is used as a power source of the heater 150b to heat the secondary battery 102b. In this manner, the rest of the secondary batteries are sequentially made operable, whereby all the secondary batteries are successively heated A secondary battery group of a vehicle is controlled by a control circuit including a CPU. The voltage of the secondary batteries is monitored, and a charging condition in charging and a discharging condition in discharging are regulated. The control circuit includes a protective circuit which prevents overcharge or overdischarge. In this embodiment, a temperature sensor is included in each secondary, whereby a system can monitor temperature in addition to electrical characteristics of the voltage and control the temperature of each secondary battery.

A sequence of a preheating mode of a temperature control system for the secondary battery at the time of low temperatures is described below with reference to an example of a flow chart in FIG. 4.

First, the temperature is measured with a temperature sensor provided in the secondary battery 102a. When the temperature is lower than the operating range of the secondary battery 102a, the control circuit stops charging and discharging. The control circuit changes the normal mode to the preheating mode to start the preheating mode.

Even if the temperature is low, there exists almost no cold area where the temperature of a secondary battery is lower than −40° C. and the temperature of the low-temperature secondary battery 101 placed on a car dashboard is higher than −40° C., and thus the low-temperature secondary battery 101 is within the operating temperature range.

The low-temperature secondary battery 101 can function as a power source of the heater 150a, and a switch that changes the on/off of the heater 150a can be also referred to as a temperature control circuit. The control circuit controls the switch 103a. When the temperature of the secondary battery 102a is low, the secondary battery 102a is heated by the heater 150a. (S11)

Then, the secondary battery 102a reaches the operable temperature owing to the heating by the heater 150a. (S12) The control circuit turns off the switch 103a when the temperature sensor of the secondary battery 102a reaches 25° C., for example.

Then, the control circuit brings the switch 103b into an on state to heat the heater 150b using the secondary battery 102a as a power source. (S13)

Then, the secondary battery 102b reaches the operable temperature owing to the heating by the heater 150b. (S14) The control circuit turns off the switch 103b when the temperature sensor of the secondary battery 102b reaches 25° C., for example.

Then, the control circuit brings the switch 103c into an on state to heat the heater 150c using the secondary battery 102b as a power source. (S15)

Then, the secondary battery 102c reaches the operable temperature owing to the heating by the heater 150c. (S16) The control circuit turns off the switch 103c when the temperature sensor of the secondary battery 102c reaches 25° C., for example.

Then, the control circuit brings the switch 103d into an on state to heat the heater 150d using the secondary battery 102c as a power source. (S17)

Then, the secondary battery 102d reaches the operable temperature owing to the heating by the heater 150d. (S18) The control circuit turns off the switch 103d when the temperature sensor of the secondary battery 102d reaches 25° C., for example.

Then, the control circuit brings the switch 103e into an on state to heat the heater 150e using the secondary battery 102d as a power source. (S19)

Then, the secondary battery 102e reaches the operable temperature owing to the heating by the heater 150e. (S20) The control circuit turns off the switch 103e when the temperature sensor of the secondary battery 102e reaches 25° C., for example.

Through the above steps, even at low temperature, the sequential heating enables the secondary batteries 102a, 102b, 102c, 102d, and 102e to be efficiently heated to the operable temperature. When all the secondary batteries 102a, 102b, 102c, 102d, and 102e have been heated to the operable temperature, the control circuit changes the pre-heating mode to the normal mode and finishes the preheating mode.

Figure 4:
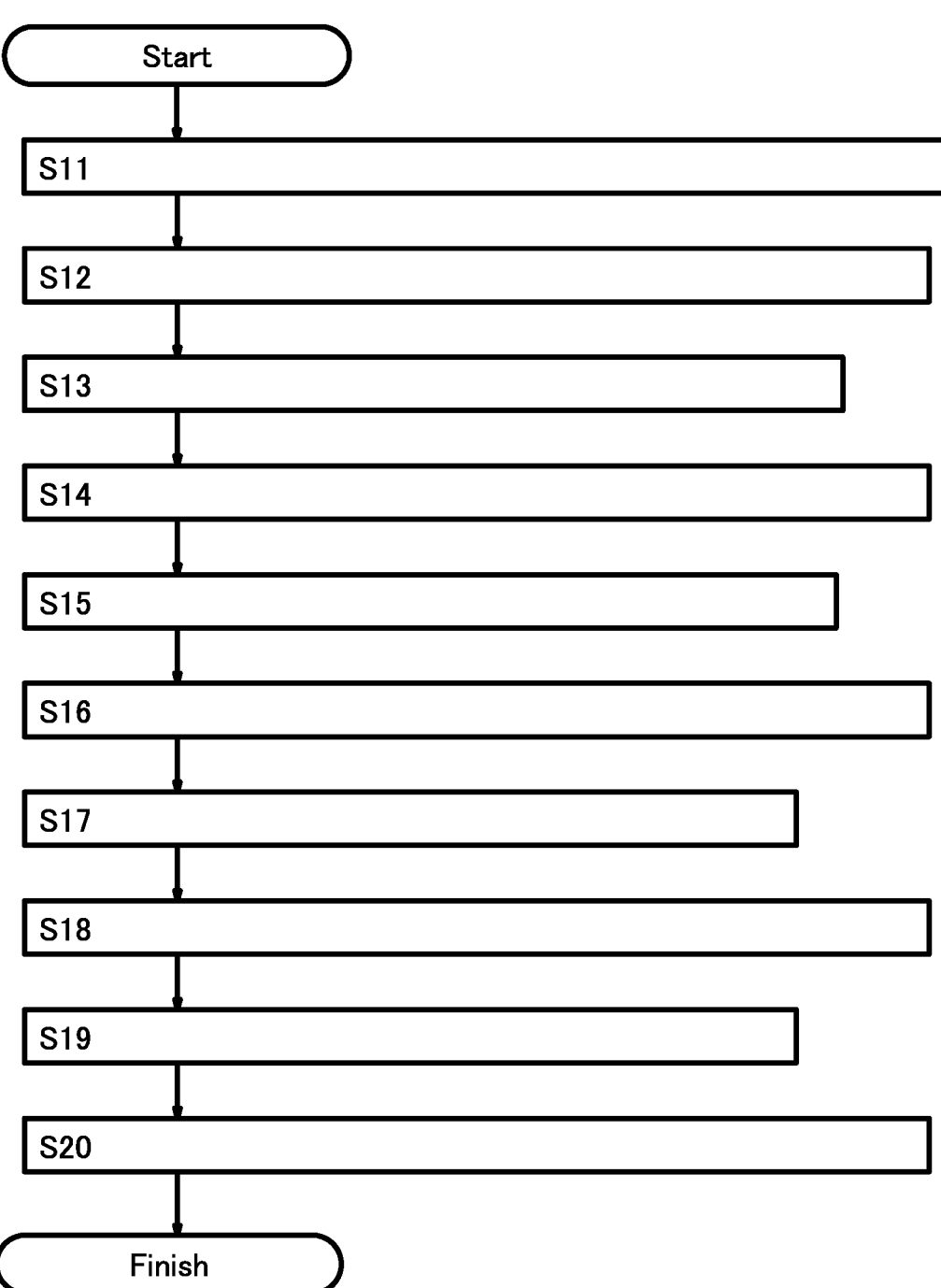
FIG. 4 is a flow chart illustrating one embodiment of the present invention.

The above sequence and FIG. 4 show the procedures in starting an electric vehicle at the time of low temperatures. The temperature of each of the secondary batteries 102a, 102b, 102c, 102d, and 102e can also be monitored continuously. Thus, when the temperature of any one of the secondary batteries is decreased and likely to be brought out of the operating temperature range during driving, the control circuit brings an appropriate switch into an on state to selectively heat the heater, whereby the temperature of the secondary battery can be maintained in the operating range. Consequently, the above structure enables accurate temperature control of the plurality of secondary batteries. Since the secondary batteries might be partly cooled, only the cooled portion can be detected by the control circuit to be selectively heated.

FIG. 1 and FIG. 3 each show the example of six secondary batteries in total of one low-temperature secondary battery and five secondary batteries connected in series. However, there is no particular limitation on the number of secondary batteries; a structure of three secondary batteries in total of one low-temperature secondary battery and two secondary batteries connected in parallel can be employed.

Figure 5:
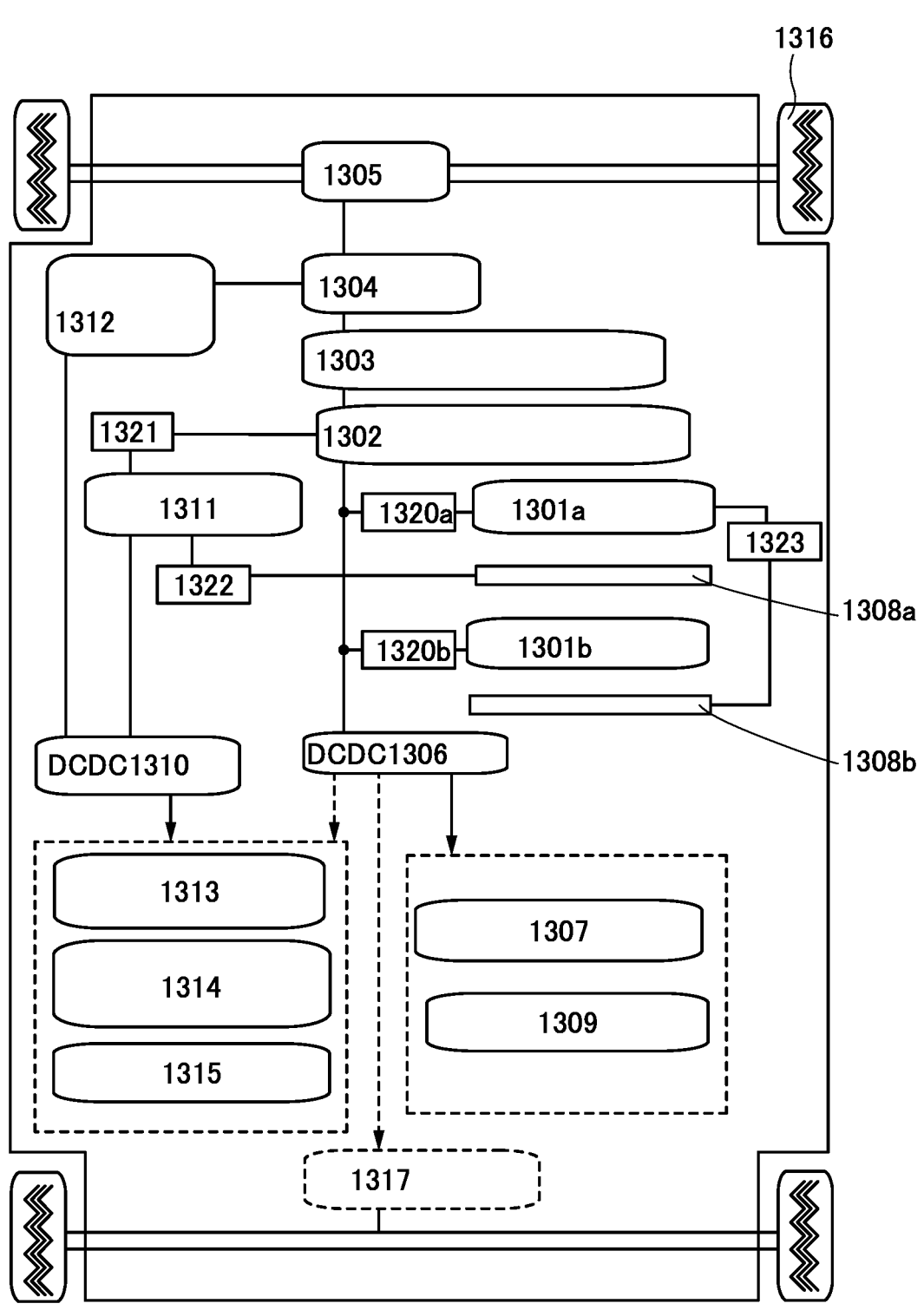
FIG. 5 is a block diagram illustrating one embodiment of the present invention.

FIG. 5 illustrates an example of a block diagram of a whole electric vehicle.

The electric vehicle illustrated in FIG. 5 includes a first secondary battery 1311 as a low-temperature secondary battery and a second secondary battery 1301a and a third secondary battery 1301b as main secondary batteries. The low-temperature secondary battery can be placed on the dashboard, and the main secondary batteries can be placed under the vehicle interior.

Through a switch 1322, the first secondary battery 1311 as the low-temperature secondary battery is connected to a heater 1308a, which heats the second secondary battery 1301a. The switch 1322 may be a relay circuit. The first secondary battery 1311 and the heater 1308a may be connected through a DCDC circuit 1310, instead of being directly connected. This embodiment employs a structure using a heater. However, with the use of self-heating as in Embodiment 1, the heater can be made unnecessary by the arrangement where self-heating of the first secondary battery 1311 can heat the second secondary battery 1301a and self-heating of the second secondary battery 1301a can heat the third secondary battery 1301b.

The first secondary battery 1311 is electrically connected to a control circuit 1302 through a monitor circuit 1321. The monitor circuit 1321 is a circuit that includes a temperature sensor and monitors a temperature or a voltage.

In a similar manner, a monitor circuit 1320a is connected to the second secondary battery 1301a and a monitor circuit 1320b is connected to the third secondary battery 1301b. Although this embodiment describes an example in which two secondary batteries, the second secondary battery 1301a and the third secondary battery 1301b, are connected in parallel, three or more secondary batteries may be connected in parallel. By forming a battery pack including a plurality of secondary batteries, large electric power can be extracted. The plurality of secondary batteries may be connected in parallel, connected in series, or connected in series after being connected in parallel. The plurality of secondary batteries can also be referred to as an assembled battery.

The first secondary battery 1311 is a low-temperature secondary battery that can be used even at low temperature as compared with the second secondary battery 1301a or the third secondary battery 1301b. Different kinds of lithium-ion secondary batteries are used and can be formed with different electrolytes, for example. As the first secondary battery 1311, a semi-solid-state battery may be used.

The first secondary battery 1311 does not necessarily need high capacity as long as it can heat the second secondary battery 1301a with the use of the heater 1308a, and the capacity of the first secondary battery 1311 may be lower than that of the second secondary battery 1301a or the third secondary battery 1301b. For example, the first secondary battery 1311 and the second secondary battery 1301a can be formed to be different with different positive electrode material.

When the ambient temperature is below freezing, the control circuit 1302 brings the switch 1322 into an on state and the first secondary battery 1311 supplies electric power to the heater 1308a to heat the second secondary battery 1301a. When the monitor circuit 1320a can verify that the second secondary battery 1301a reaches the operating temperature range, the control circuit 1302 brings a switch 1323 into an on state, a heater 1308b performs heating using the second secondary battery 1301a as a power source, and monitoring by the monitor circuit 1320b is performed until the third secondary battery 1301b is brought within the operating temperature range. The second secondary battery 1301a and the heater 1308b may be connected through a DCDC circuit 1306, instead of being directly connected.

After the temperature of the second secondary battery 1301a is increased to reach the operating temperature range, the third secondary battery 1301b may be heated by both the heater 1308a and the heater 1308b.

The control circuit 1302 obtains electric power from any one of the first secondary battery 1311, the second secondary battery 1301a, and the third secondary battery 1301b and supplies electric power to an inverter 1312, which starts a motor 1304. With such a structure, the first secondary battery 1311 may function as a cranking battery (also referred to as starter battery) at low temperature, and the second secondary battery 1301a and the third secondary battery 1301b may function as cranking batteries at high temperature. The motor 1304 is also referred to as an electric motor.

Electric power from the second secondary battery 1301a and the third secondary battery 1301b is mainly used to rotate the motor 1304 and is also supplied to in-vehicle parts for 42 V (an electric power steering 1307 and a defogger 1309) through a DCDC circuit 1306. In the case where there is a rear motor 1317 for the rear wheels, the second secondary battery 1301*a* and the third secondary battery 1301*b* are used to rotate the rear motor 1317.

The first secondary battery 1311 may supply electric power not only to the heater 1308*a* but also to in-vehicle parts for 14 V (such as an audio 1313, power windows 1314, and lamps 1315) through the DCDC circuit 1310.

Regenerative energy generated by rolling of tires 1316 is transmitted to the motor 1304 through a gear 1305, and the first secondary battery 1311 is charged with the energy from a motor controller 1303 or the control circuit 1302 through the monitor circuit 1321. Alternatively, the second secondary battery 1301*a* is charged with the energy from the control circuit 1302 through the monitor circuit 1320*a*. Alternatively, the third secondary battery 1301*b* is charged with the energy from the control circuit 1302 through the monitor circuit 1320*b*. For efficient charging with the regenerative energy, the second secondary battery 1301*a* and the third secondary battery 1301*b* can desirably be fast charged.

The control circuit 1302 can set the charging voltages and charging currents of the second secondary battery 1301*a* and the third secondary battery 1301*b*. The control circuit 1302 can set the temperatures of the secondary batteries or charging conditions in accordance with the charging characteristics of the different secondary batteries, whereby fast charging can be performed.

Although not illustrated, when the electric vehicle is connected to an external charger, a plug of the charger or a connection cable of the charger is electrically connected to the control circuit 1302. The second secondary battery 1301*a* and the third secondary battery 1301*b* are charged with electric power supplied from the external charger through the control circuit 1302. The charger is sometimes provided with a control circuit, in which case the function of the control circuit 1302 is not used. However, the second secondary battery 1301*a* and the third secondary battery 1301*b* are preferably charged through the monitor circuits 1320*a* and 1320*b* each including a protective circuit for preventing overcharge. In addition, a connection cable or a connection cable of the charger is sometimes provided with the control circuit. The control circuit 1302 is also referred to as an ECU (electronic control unit). The ECU is connected to a CAN (controller area network) provided in the electric vehicle. The CAN is a type of a serial communication standard used as an in-vehicle LAN. The ECU includes a microcomputer. Moreover, the ECU uses a CPU or a GPU.

External chargers installed at charging stations have a 100 V outlet, a 200 V outlet, or a three-phase 200V outlet with 50 kW. Furthermore, charging can be performed with electric power supplied from external charging equipment by a contactless power feeding system or the like.

Since the second secondary battery 1301*a* can be heated by the heater 1308*a* with the first secondary battery 1311 which is a low-temperature secondary battery, a control system for a secondary battery which is less affected by the ambient temperature can be provided.

This embodiment can be freely combined with the other embodiments.

Embodiment 3

Figure 6:
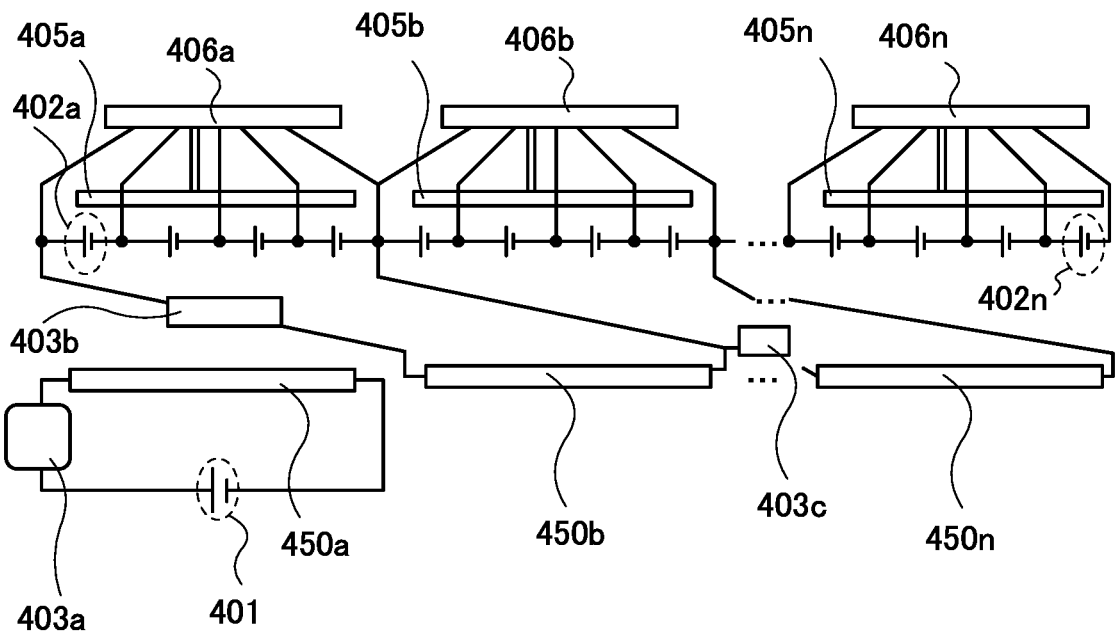
FIG. 6 is a conceptual diagram illustrating one embodiment of the present invention.

In this embodiment, a structure example including one low-temperature secondary battery as in Embodiment 1 and a plurality of groups each including four secondary batteries of another kind is illustrated in FIG. 6.

In this embodiment, as illustrated in a conceptual diagram in FIG. 6, a low-temperature secondary battery 401 and n (n is a multiple of 4) secondary batteries (402*a* to 402*n*) are used.

The power source is composed of the low-temperature secondary battery 401, a switch 403*a*, and a heater 450*a* and controlled by a control circuit not illustrated. Specifically, at the time of low temperatures, the heater 450*a* is heated and four secondary batteries including the secondary battery 402*a* are heated. The switch 403*a* is not limited to a switch and may be a relay circuit.

The four secondary batteries are provided with one common temperature sensor 405*a* and one common monitor circuit 406*a*. The four secondary batteries that have become operable by heating with the heater 450*a* supply electric power to a heater 450*b* for heating the rest of the secondary batteries. For the heater 450*b*, the on/off of a switch 403*b* is controlled by the control circuit. The switch 403*b* may be combined with a variable resistor. The heater 450*b* is provided to heat four of the rest of the secondary batteries. Furthermore, a heater using the four secondary batteries heated by the heater 450*b* as a power source is provided and controlled by a switch 403*c*. Such structures are repeatedly placed, where once four secondary batteries including a last n-th secondary battery 402*n* are heated by a heater 450*n*, the secondary batteries connected in series all become operable even when the ambient temperature is low. The four secondary batteries including the last n-th secondary battery 402*n* are provided with one common temperature sensor 405*n* and one common monitor circuit 406*n*.

The monitor circuit 406*a* can also function as a cell balancer of the four secondary batteries. The cell balancer is a circuit that equalizes voltages between the secondary batteries forming one group.

Although the secondary batteries are individually heated in Embodiment 1, the structure in which the secondary batteries are divided into a plurality of groups to be heated can reduce the number of temperature sensors or monitor circuits as compared to Embodiment 1. This structure can also reduce the number of heaters as compared to Embodiment 2. Since four secondary batteries can be heated at the same time, this structure can shorten the time to the end of preheating of all the secondary batteries as compared to Embodiment 1.

A temperature sensor and a monitor circuit may form one IC chip.

Although not illustrated in FIG. 6, the control circuit is electrically connected to the switches 403*a*, 403*b*, 403*c*, and 403*n* which control the on/off of the heaters, the monitor circuits 406*a*, 406*b*, and 406*n*, or the temperature sensors 405*a*, 405*b*, and 405*n*.

The control circuit may use a memory element including an OS transistor. A memory element using an OS transistor can be freely placed by being stacked over a circuit using a Si transistor; hence, integration can be easy like integration such as a structure where a protective circuit is stacked over the control circuit, a structure where a monitor circuit is stacked over the control circuit, or a structure where a temperature sensor is stacked over the control circuit, for example. Furthermore, an OS transistor can be manufactured with a manufacturing apparatus similar to that for a Si transistor and thus can be manufactured at low cost.

In the OS transistor, a metal oxide functioning as an oxide semiconductor is preferably used in the channel formation region. For example, as the metal oxide, a metal oxide such as an In-M-Zn oxide (the element M is one or more selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used.

Specifically, as the metal oxide, a metal oxide having In:Ga:Zn=1:3:4 [atomic ratio] or 1:1:0.5 [atomic ratio] is used. As the metal oxide, a metal oxide having In:Ga:Zn=4:2:3 [atomic ratio] or 1:1:1 [atomic ratio] is used. As the metal oxide, a metal oxide having In:Ga:Zn=1:3:4 [atomic ratio], Ga:Zn=2:1 [atomic ratio], or Ga:Zn=2:5 [atomic ratio] is used. Specific examples of the metal oxide having a stacked-layer structure include a stacked-layer structure of In:Ga:Zn=4:2:3 [atomic ratio] and In:Ga:Zn=1:3:4 [atomic ratio], a stacked-layer structure of Ga:Zn=2:1 [atomic ratio] and In:Ga:Zn=4:2:3 [atomic ratio], a stacked-layer structure of Ga:Zn=2:5 [atomic ratio] and In:Ga:Zn=4:2:3 [atomic ratio], and a stacked-layer structure of gallium oxide and In:Ga:Zn=4:2:3 [atomic ratio].

The metal oxide may have crystallinity. For example, a CAAC-OS (c-axis aligned crystalline oxide semiconductor) described later is preferably used. An oxide having crystallinity, CAAC-OS, has a dense structure with small amounts of impurities or defects (oxygen vacancies) and high crystallinity. This can inhibit extraction of oxygen from the metal oxide by the source electrode or the drain electrode. Oxygen extraction from the metal oxide can be suppressed even when heat treatment is performed; thus, the OS transistor is stable with respect to high temperatures in the manufacturing process (what is called thermal budget).

For the structure of the control circuit or the protective circuit, with the use of a memory element including an OS transistor, a reference voltage can be retained in the memory element by utilizing an extremely low leakage current flowing between a source and a drain when the transistor is off (hereinafter off-state current). At this time, the memory element can be powered off; thus, with the use of the memory element including the OS transistor, the reference voltage can be retained with extremely low power consumption.

The memory element including the OS transistor can retain an analog potential. For example, a voltage of a secondary battery can be retained in the memory element without being converted to a digital value with an analog-to-digital converter circuit. Since the converter circuit is unnecessary, the circuit area can be reduced.

In addition, the memory element using the OS transistor can rewrite and read the reference voltage by charging or discharging electric charge; thus, a substantially unlimited number of times of acquisition and reading of the monitor voltage is possible. The memory element using the OS transistor is superior in rewrite endurance because, unlike a magnetic memory or a resistive random-access memory, it does not go through atomic-level structure change. Furthermore, unlike in a flash memory, unstableness due to the increase of electron trap centers is not observed in the memory element using the OS transistor even when rewrite operation is repeated.

An OS transistor has features of an extremely low off-state current and favorable switching characteristics even in a high-temperature environment. Accordingly, charging or discharging of the plurality of secondary batteries (assembled battery) can be controlled without a malfunction even in a high-temperature environment.

A memory element using an OS transistor can be freely placed by being stacked over a circuit using a Si transistor; hence, integration can be easy. Furthermore, an OS transistor can be manufactured with a manufacturing apparatus similar to that for a Si transistor and thus can be manufactured at low cost.

An OS transistor can be a four-terminal semiconductor element when having a back gate electrode in addition to a gate electrode, a source electrode, and a drain electrode. An electric network where input and output of signals flowing between a source and a drain can be independently controlled in accordance with a voltage applied to a gate electrode or a back gate electrode can be constituted. Thus, circuit design with the same ideas as those of an LSI is possible. Furthermore, electrical characteristics of the OS transistor are better than those of a Si transistor in a high-temperature environment. Specifically, the ratio between on-state current and off-state current is large even at a high temperature higher than or equal to 100° C. and lower than or equal to 200° C., preferably higher than or equal to 125° C. and lower than or equal to 150° C.; hence, favorable switching operation can be performed.

This embodiment can be freely combined with any of the other embodiments.

Embodiment 4

In this embodiment, an example of a cylindrical secondary battery that can be used as the secondary batteries 102a, 102b, 102c, 102d, and 102e described in Embodiment 1 is described with reference to FIG. 7.

Figures 7A, 7B, 7C, 7D:
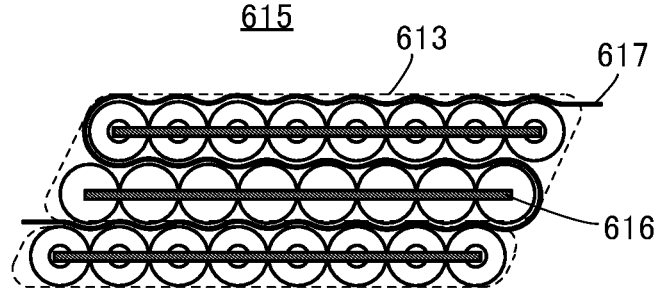
FIG. 7A is a view illustrating the appearance of a cylindrical secondary battery.
FIG. 7B is an exploded perspective view.
FIG. 7C is a perspective view of a module 615.
FIG. 7D is a top view of a module.

As illustrated in FIG. 7A, a cylindrical secondary battery 600 includes the positive electrode cap (battery cap) 601 on the top surface and the battery can (outer can) 602 on the side and bottom surfaces. The positive electrode cap and the battery can (outer can) 602 are insulated from each other by the gasket (insulating gasket) 610.

FIG. 7B is a diagram schematically illustrating a cross-section of the cylindrical secondary battery. Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having corrosion resistance to a solvent, such as nickel, aluminum, or titanium, an alloy of such a metal, or an alloy of such a metal and another metal (e.g., stainless steel) can be used. The battery can 602 is preferably covered with nickel, aluminum, or the like in order to prevent corrosion due to the solvent. Inside the battery can 602, the battery element in which the positive electrode, the negative electrode, and the separator are wound is provided between a pair of insulating plates 608 and 609 that face each other. The inside of the battery can 602 provided with the battery element is filled with a nonaqueous electrolyte (not illustrated). As the nonaqueous electrolyte, an electrolyte similar to that for the coin-type secondary battery can be used.

Since a positive electrode and a negative electrode that are used for a cylindrical storage battery are wound, active materials are preferably formed on both surfaces of a current collector. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material of aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC (Positive Temperature Coefficient) 611. The safety valve mechanism 612 cuts off electrical connection between the positive electrode cap 601 and the positive electrode 604 when the internal pressure of the battery exceeds a predetermined threshold. The PTC element 611, which is a thermally sensitive resistor whose resistance increases as temperature rises, limits the amount of current by increasing the resistance, in order to prevent abnormal heat generation. Barium titanate (BaTiO$_3$)-based semiconductor ceramic or the like can be used for the PTC element.

As illustrated in FIG. 7C, a plurality of secondary batteries 600 may be provided between a conductive plate 613 and a conductive plate 614 to form a module 615. The plurality of secondary batteries 600 may be connected in parallel, connected in series, or connected in series after being connected in parallel. With the module 615 including the plurality of secondary batteries 600, large electric power can be extracted.

FIG. 7D is a top view of the module 615. The conductive plate 613 is shown by a dotted line for clarity of the diagram. As illustrated in FIG. 7D, the module 615 may include a wiring 616 electrically connecting the plurality of secondary batteries 600 with each other. It is possible to provide the conductive plate over the wiring 616 to overlap with each other. In addition, a heater 617 may be provided between the plurality of secondary batteries 600. FIG. 7D illustrates a structure where a group of 24 secondary batteries 600 is heated by one heater 617; a plurality of groups are provided when mounted on a vehicle. Thus, a plurality of heaters 617 are provided in the structure, which includes a control circuit that enables heating of them. The secondary batteries 600 can be heated by the heater 617 using a low-temperature secondary battery as a power source when the secondary batteries 600 are cooled by the external environment to fall to the lower operating temperature limit or lower. In addition, providing the low-temperature secondary battery reduces the adverse effect of the ambient temperature on the performance of the module 615. A heating medium included in the heater 617 preferably has an insulating property and incombustibility.

With the use of the temperature control system for a secondary battery described in the above embodiment, the module 615 can be provided with a low-temperature secondary battery and less affected by the ambient temperature.
[Structure Examples of Secondary Battery]

Structure examples of secondary batteries are described with reference to FIG. 8 and FIG. 9.

Figures 8A, 8B, 8C:
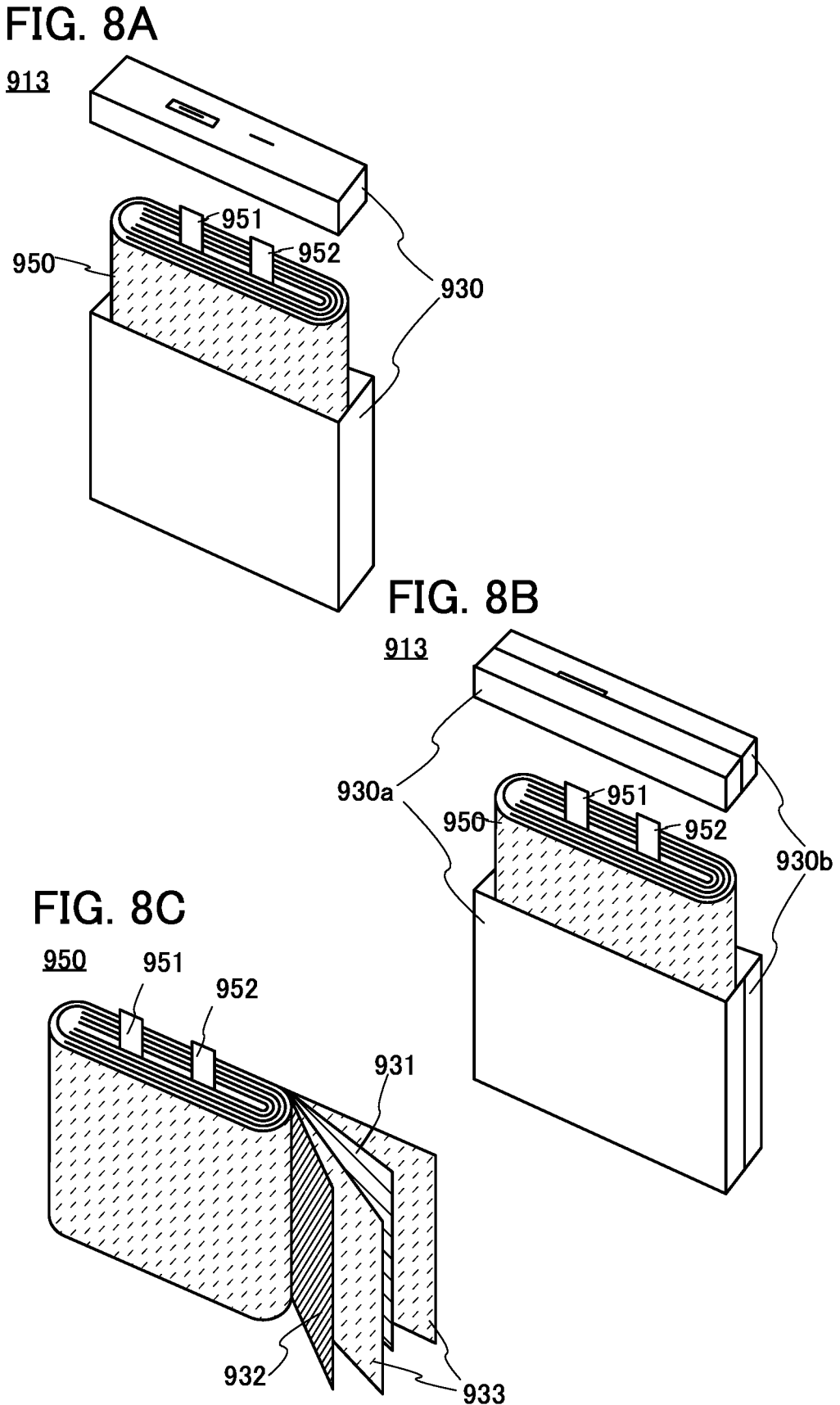
FIG. 8A and FIG. 8B are perspective views of a secondary battery.
FIG. 8C is a perspective view of a wound body.

A secondary battery 913 illustrated in FIG. 8A includes a wound body 950 provided with a terminal 951 and a terminal 952 inside a housing 930. The terminal 952 is in contact with the housing 930. The use of an insulating material inhibits contact between the terminal 951 and the housing 930. Note that in FIG. 8A, the housing 930 divided into pieces is illustrated for convenience; however, in the actual structure, the wound body 950 is covered with the housing 930, and the terminal 951 and the terminal 952 extend to the outside of the housing 930. For the housing 930, a metal material (e.g., aluminum) or a resin material can be used.

Note that as illustrated in FIG. 8B, the housing 930 in FIG. 8A may be formed using a plurality of materials. For example, in the secondary battery 913 illustrated in FIG. 8B, a housing 930a and a housing 930b are attached to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the secondary battery 913 can be inhibited. When an electric field is not significantly blocked by the housing 930a, an antenna may be provided inside the housing 930a. For the housing 930b, a metal material can be used, for example.

FIG. 8C illustrates the structure of the wound body 950. The wound body 950 includes a negative electrode 931, a positive electrode 932, and separators 933. The wound body 950 is obtained by winding a sheet of a stack in which the negative electrode 931 and the positive electrode 932 overlap with the separator 933 therebetween. Note that a plurality of stacks each including the negative electrode 931, the positive electrode 932, and the separators 933 may be further stacked.

As illustrated in FIG. 9, the secondary battery 913 may include a wound body 950a. The wound body 950a illustrated in FIG. 9A includes the negative electrode 931, the positive electrode 932, and the separators 933. The negative electrode 931 includes a negative electrode active material layer 931a. The positive electrode 932 includes a positive electrode active material layer 932a.

The separator 933 has a larger width than the negative electrode active material layer 931a and the positive electrode active material layer 932a, and is wound to overlap the negative electrode active material layer 931a and the positive electrode active material layer 932a. In terms of safety, the width of the negative electrode active material layer 931a is preferably greater than that of the positive electrode active material layer 932a. The wound body 950a having such a shape is preferable because of its high degree of safety and high productivity.

As illustrated in FIG. 9B, the negative electrode 931 is electrically connected to the terminal 951. The terminal 951 is electrically connected to a terminal 911a. The positive electrode 932 is electrically connected to the terminal 952. The terminal 952 is electrically connected to a terminal 911b. As illustrated in FIG. 9B, two wound bodies 950a are stored in one housing 930.

As illustrated in FIG. 9C, the wound body 950a is covered with the housing 930, whereby the secondary battery 913 is completed. The housing 930 is preferably provided with a safety valve, an overcurrent protection element, and the like. A safety valve is a valve to be released by a predetermined internal pressure of the housing 930 in order to prevent the battery from exploding.

As illustrated in FIG. 9B, the secondary battery 913 may include a plurality of wound bodies 950a. The use of the plurality of wound bodies 950a enables the secondary battery 913 to have higher charge and discharge capacity. The description of the secondary battery 913 illustrated in FIG. 8A to FIG. 8C can be referred to for the other components of the secondary battery 913 illustrated in FIG. 9A and FIG. 9B.
<Laminated Secondary Battery>

Figure 10A:
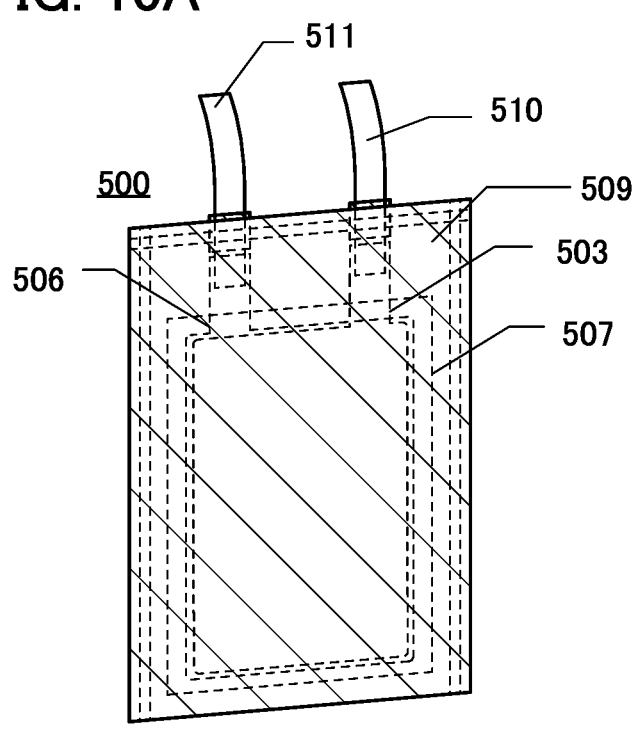
FIG. 10A and FIG. 10B are external views of a secondary battery.
Figure 10B:
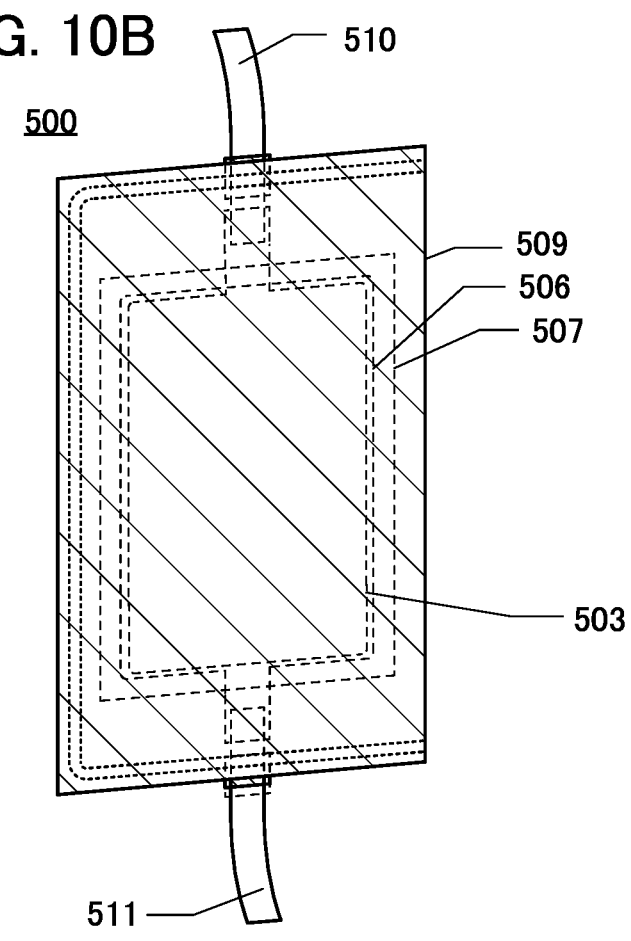

Next, examples of the appearance of a laminated secondary battery are shown in FIG. 10A and FIG. 10B. In FIG. 10A and FIG. 10B, there are a positive electrode 503, a negative electrode 506, a separator 507, an exterior body 509, a positive electrode lead electrode 510, and a negative electrode lead electrode 511.

FIG. 11A illustrates the appearance of the positive electrode 503 and the negative electrode 506. The positive electrode 503 includes a positive electrode current collector 501, and a positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes a negative electrode current collector 504, and a negative electrode active material layer 505 is formed on a surface of the negative electrode current collector 504. The negative electrode 506 also includes a region where the negative electrode current collector 504 is partly exposed, that is, a tab region. The areas or the shapes of the tab regions included in the positive electrode and the negative electrode are not limited to the examples shown in FIG. 11A.

<Method for Manufacturing Laminated Secondary Battery>

Here, an example of a method for manufacturing the laminated secondary battery whose external view is shown in FIG. 10A will be described with reference to FIG. 11B and FIG. 11C.

First, the negative electrode 506, the separator 507, and the positive electrode 503 are stacked. FIG. 11B illustrates the negative electrodes 506, the separators 507, and the positive electrodes 503 that are stacked. Here, an example in which five negative electrodes and four positive electrodes are used is shown. The component can also be referred to as a stack including the negative electrodes, the separators, and the positive electrodes. Next, the tab regions of the positive electrodes 503 are bonded to each other, and the positive electrode lead electrode 510 is bonded to the tab region of the positive electrode on the outermost surface. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

Then, the negative electrodes 506, the separators 507, and the positive electrodes 503 are placed over the exterior body 509.

[Negative Electrode]

The negative electrode includes a negative electrode active material layer and a negative electrode current collector. The negative electrode active material layer may include a conductive additive and a binding agent.

<Negative Electrode Active Material>

As the negative electrode active material, for example, an alloy-based material or a carbon-based material can be used.

For the negative electrode active material, an element that enables charge and discharge reactions by an alloying and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon, and especially, silicon has a high theoretical capacity of 4200 mAh/g. For this reason, silicon is preferably used as the negative electrode active material. Alternatively, a compound containing any of the above elements may be used. Examples of the compound include $SiO$, $Mg_2Si$, $Mg_2Ge$, $SnO$, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$. Here, an element that enables charge and discharge reactions by an alloying and a dealloying reaction with lithium and a compound containing the element, for example, may be referred to as an alloy-based material.

In this specification and the like, SiO refers, for example, to silicon monoxide. Note that SiO can alternatively be expressed as $SiO_x$. Here, x is preferably 1 or an approximate value of 1. For example, x is preferably greater than or equal to 0.2 and less than or equal to 1.5, further preferably greater than or equal to 0.3 and less than or equal to 1.2.

As the carbon-based material, graphite, graphitizing carbon (soft carbon), non-graphitizing carbon (hard carbon), carbon nanotube, graphene, carbon black, and the like may be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (greater than or equal to 0.05 V and less than or equal to 0.3 V vs. $Li/Li^+$) when lithium ions are inserted into graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and a higher level of safety than that of a lithium metal.

As the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Alternatively, as the negative electrode active material, $Li_{3-x}M_xN$ (M is Co, Ni, or Cu) with a $Li_3N$ structure, which is a nitride of lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material that does not contain lithium ions, such as $V_2O_5$ or $Cr_3O_8$. Note that in the case of using a material containing lithium ions as a positive electrode active material, the nitride of lithium and a transition metal can be used as the negative electrode active material by extracting the lithium ions contained in the positive electrode active material in advance.

Alternatively, a material that causes a conversion reaction can be used for the negative electrode active material; for example, a transition metal oxide that does not form an alloy with lithium, such as cobalt oxide (CoO), nickel oxide (NiO), or iron oxide (FeO), may be used. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those for the conductive additive and the binder that can be included in the positive electrode active material layer can be used.

<Negative Electrode Current Collector>

For the negative electrode current collector, a material similar to that of the positive electrode current collector can be used. Note that a material that is not alloyed with carrier ions of lithium or the like is preferably used for the negative electrode current collector.

[Separator]

The separator is positioned between the positive electrode and the negative electrode. The separator can be formed using, for example, a fiber containing cellulose, such as paper, nonwoven fabric, glass fiber, ceramics, or synthetic fiber containing nylon (polyamide), vinylon (polyvinyl alcohol-based fiber), polyester, acrylic, polyolefin, or polyurethane. The separator is preferably processed into a bag-like shape to enclose one of the positive electrode and the negative electrode.

The separator may have a multilayer structure. For example, an organic material film of polypropylene, polyethylene, or the like can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charging and discharging at high voltage can be suppressed and thus the reliability of the secondary battery can be improved. When the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Positive Electrode]

The positive electrode includes a positive electrode active material layer and a positive electrode current collector. The positive electrode active material layer may include a conductive additive and a binding agent.

<Positive Electrode Active Material>

A positive electrode active material preferably contains a metal serving as a carrier ion (hereinafter an element A). As the element A, an alkali metal such as lithium, sodium, or potassium or a Group 2 element such as calcium, beryllium, or magnesium can be used, for example.

In the positive electrode active material, carrier ions are extracted from the positive electrode active material due to charge. A larger amount of the extracted element A means a larger amount of ions contributing to the capacity of a secondary battery, increasing the capacity. Meanwhile, a large amount of the extracted element A easily causes collapse of the crystal structure of a compound contained in the positive electrode active material. Collapse of the crystal structure of the positive electrode active material may lead to a decrease in the discharge capacity due to charge and discharge cycles. The positive electrode active material contains the element X, whereby collapse of a crystal structure that would occur when carrier ions are extracted in charge of a secondary battery may be suppressed. Part of the element X substitutes at an element A position, for example. An element such as magnesium, calcium, zirconium, lanthanum, or barium can be used as the element X. As another example, an element such as copper, potassium, sodium, or zinc can be used as the element X. Two or more of the elements described above as the element X may be used in combination.

Furthermore, the positive electrode active material preferably contains halogen in addition to the element X The positive electrode active material preferably contains halogen such as fluorine or chlorine. When the positive electrode active material contains the halogen, substitution of the element X at the position of the element A is promoted in some cases.

In the case where the positive electrode active material contains the element X or contains halogen in addition to the element X, electrical conductivity on the surface of the positive electrode active material is sometimes suppressed.

The positive electrode active material contains a metal whose valence number changes due to charge and discharge of a secondary battery (hereinafter an element M). The element M is a transition metal, for example. The positive electrode active material contains one or more of cobalt, nickel, and manganese, particularly cobalt, as the element M, for example. The positive electrode active material may contain, at an element M position, an element that has no valence number change and can have the same valence number as the element M, such as aluminum, specifically, a trivalent representative element, for example. The above-described element X may be substituted at the element M position, for example. In the case where the positive electrode active material is an oxide, the element X may substitute at an oxygen position.

As the positive electrode active material, a lithium composite oxide having a layered rock-salt crystal structure is preferably used, for example. Specifically, as the lithium composite oxide having a layered rock-salt crystal structure, lithium cobalt oxide, lithium nickel oxide, a lithium composite oxide containing nickel, manganese, and cobalt, or a lithium composite oxide containing nickel, cobalt, and aluminum can be used, for example. Moreover, such a positive electrode active material is preferably represented by a space group R-3m.

In the positive electrode active material having a layered rock-salt crystal structure, increasing the charge depth may cause collapse of a crystal structure. Here, collapse of a crystal structure refers to displacement of a layer, for example. In the case where collapse of a crystal structure is irreversible, the capacity of a secondary battery might be decreased by repeated charges and discharges.

The positive electrode active material includes the element X, whereby the displacement of a layer can be suppressed even when the charge depth is increased, for example. By suppressing the displacement, a change in volume due to charge and discharge can be small. Accordingly, the positive electrode active material can achieve excellent cycle performance. In addition, the positive electrode active material can have a stable crystal structure in a high-voltage charging state. Thus, in the positive electrode active material, a short circuit is less likely to occur while the high-voltage charging state is maintained. This is preferable because the safety is further improved.

The positive electrode active material has a small change in the crystal structure and a small difference in volume per the same number of transition metal atoms between a sufficiently discharging state and a high-voltage charging state.

The positive electrode active material may be represented by the chemical formula $AM_yO_z$ ($y>0$, $z>0$). For example, lithium cobalt oxide may be represented by $LiCoO_2$. As another example, lithium nickel oxide may be represented by $LiNiO_2$.

When the charge depth is greater than or equal to 0.8, the positive electrode active material, which contains the element X, may have a structure that is represented by the space group R-3m and is not a spinel crystal structure but is a structure where oxygen is hexacoordinated to ions of the element M (e.g., cobalt), the element X (e.g., magnesium), and the like and the cation arrangement has symmetry similar to that of the spinel crystal structure. This structure is referred to as a pseudo-spinel crystal structure in this specification and the like. Note that in the pseudo-spinel crystal structure, oxygen is tetracoordinated to a light element of lithium in some cases. Also in that case, the ion arrangement has symmetry similar to that of the spinel crystal structure.

Extraction of carrier ions due to charge makes the structure of a positive electrode active material unstable. The pseudo-spinel crystal structure is said to be a structure that can maintain high stability in spite of extraction of carrier ions.

The pseudo-spinel crystal structure can be regarded as a crystal structure that contains Li between layers randomly and is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material including a large amount of cobalt is known not to have this crystal structure generally.

Anions of a layered rock-salt crystal and anions of a rock-salt crystal have a cubic close-packed structure (face-centered cubic lattice structure). Anions of a pseudo-spinel crystal are also presumed to form a cubic close-packed structure. When the pseudo-spinel crystal is in contact with the layered rock-salt crystal and the rock-salt crystal, there is a crystal plane at which orientations of cubic close-packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic close-packed structures composed of anions in the layered rock-salt crystal, the pseudo-spinel crystal, and the rock-salt crystal are aligned is sometimes referred to as a state where crystal orientations are substantially aligned.

In the unit cell of the pseudo-spinel crystal structure, the coordinates of cobalt and oxygen can be represented by Co (0, 0, 0.5) and O (0, 0, x) within the range of $0.20 \leq x \leq 0.25$.

In the positive electrode active material, a difference between the volume of the unit cell with a charge depth of 0 and the volume per unit cell of the pseudo-spinel crystal structure with a charge depth of 0.82 is preferably less than or equal to 2.5%, further preferably less than or equal to 2.2%.

The pseudo-spinel crystal structure has diffraction peaks at $2\theta$ of $19.30 \pm 0.20°$ (greater than or equal to $19.10°$ and less than or equal to $19.50°$) and $2\theta$ of $45.55 \pm 0.10°$ (greater than or equal to $45.45°$ and less than or equal to $45.65°$). More specifically, sharp diffraction peaks appear at $2\theta$ of $19.30 \pm 0.10°$ (greater than or equal to $19.20°$ and less than or equal to $19.40°$) and $2\theta$ of $45.55 \pm 0.05°$ (greater than or equal to $45.50°$ and less than or equal to $45.60$).

Note that although the positive electrode active material has the pseudo-spinel crystal structure when being charged with a high voltage, not all the particles necessarily have the pseudo-spinel crystal structure. The particles may have another crystal structure, or some of the particles may be amorphous. Note that when the XRD patterns are analyzed by the Rietveld analysis, the pseudo-spinel crystal structure preferably accounts for more than or equal to 50 wt %, further preferably more than or equal to 60 wt %, still further preferably more than or equal to 66 wt % of the positive electrode active material. The positive electrode active material in which the pseudo-spinel crystal structure accounts for more than or equal to 50 wt %, further preferably more than or equal to 60 wt %, still further preferably more than or equal to 66 wt % can have sufficiently good cycle performance.

The number of atoms of the element X is preferably greater than or equal to 0.001 times and less than or equal to 0.1 times the number of atoms of the element M, further preferably greater than 0.01 and less than 0.04, still further preferably approximately 0.02. The concentration of the element X described here may be a value obtained by element analysis on the entire particle of the positive electrode active material using ICP-MS or the like, or may be a value based on the ratio of the raw materials mixed in the process of forming the positive electrode active material, for example.

In the case where cobalt and nickel are contained as the element M the proportion of nickel atoms (Ni) in the sum of cobalt atoms and nickel atoms (Co+Ni) (Ni/(Co+Ni)) is preferably less than 0.1, further preferably less than or equal to 0.075.

The positive electrode active material is not limited to the materials described above.

As the positive electrode active material, a composite oxide with a spinel crystal structure can be used, for example. Alternatively, a polyanionic material can be used as the positive electrode active material, for example. Examples of the polyanionic material include a material with an olivine crystal structure and a material with a NASICON structure. Alternatively, a material containing sulfur can be used as the positive electrode active material, for example.

As the material with a spinel crystal structure, for example, a composite oxide represented by $LiM_2O_4$ can be used. It is preferable to contain Mn as the element M. For example, $LiMn_2O_4$ can be used. It is preferable to contain Ni in addition to Mn as the element M because the discharge voltage and the energy density of the secondary battery are increased in some cases. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese, such as $LiMn_2O_4$, because the performance of the secondary battery can be improved.

As a polyanionic material, for example, a composite oxide containing oxygen, the metal A, the metal M, and an element Z can be used. The metal A is one or more of Li, Na, and Mg; the metal M is one or more of Fe, Mn, Co, Ni, Ti, V, and Nb; and the element Z is one or more of S, P, Mo, W, As, and Si.

As the material with an olivine crystal structure, for example, a composite material (general formula LiMPO$_4$ (M is one or more of Fe(II), Mn(II), Co(II), and Ni(II)) can be used. Typical examples of the general formula LiMPO$_4$ include lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b 1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

Alternatively, a composite material such as a general formula Li$_{(2-j)}$MSiO$_4$ (M is one or more of Fe(II), Mn(II), Co(II), and Ni(II); 0≤j≤2) can be used. Typical examples of the general formula Li$_{(2-j)}$MSiO$_4$ include lithium compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$M$_N$SiO$_4$ (m+n+q≤1, 0<m<1, 0<n<1, and 0<q<1), and Li$_{(2-j)}$Fe$_r$Ni$_s$Co$_t$Mm$_n$SiO$_4$ (r+s+t+u≤1, 0<r<1, 0<s<1, 0<t<1, and 0<u<1).

Still alternatively, a NASICON compound represented by a general formula A$_x$M$_2$(XO$_4$)$_3$ (A=Li, Na, or Mg, M=Fe, Mn, Ti, V, or Nb, X=S, P, Mo, W, As, or Si) can be used. Examples of the NASICON compound include Fe$_2$(MnO$_4$)$_3$, Fe$_2$(SO$_4$)$_3$, and Li$_3$Fe$_2$(PO$_4$)$_3$. Further alternatively, a compound represented by a general formula Li$_2$MPO$_4$F, Li$_2$MP$_2$O$_7$, or Li$_5$MO$_4$ (M=Fe or Mn) can be used as the positive electrode active material.

Further alternatively, a perovskite fluoride such as NaFeF$_3$ and FeF$_3$, a metal chalcogenide (a sulfide, a selenide, or a telluride) such as TiS$_2$ and MoS$_2$, an oxide with an inverse spinel crystal structure such as LiMVO$_4$, a vanadium oxide (V$_2$O$_5$, V$_6$O$_{13}$, LiV$_3$O$_8$, or the like), a manganese oxide, an organic sulfur compound, or the like may be used as the positive electrode active material.

Alternatively, a borate-based material represented by a general formula LiMBO$_3$ (M is Fe(II), Mn(II), or Co(II)) may be used as the positive electrode active material.

As a material containing sodium, for example, an oxide containing sodium such as NaFeO$_2$, Na$_{2/3}$[Fe$_{1/2}$Mn$_{1/2}$]O$_2$, Na$_{2/3}$[Ni$_{1/3}$Mn$_{2/3}$]O$_2$, Na$_2$Fe$_2$(SO$_4$)$_3$, Na$_3$V$_2$(PO$_4$)$_3$, Na$_2$FePO$_4$F, NaVPO$_4$F, NaMPO$_4$ (M is Fe(II), Mn(II), Co(II), or Ni(II)), Na$_2$FePO$_4$F, or Na$_4$Co$_3$(PO$_4$)$_2$P$_2$O$_7$ may be used as the positive electrode active material.

As the positive electrode active material, a lithium-containing metal sulfide may be used. Examples of the lithium-containing metal sulfide are Li$_2$TiS$_3$ and Li$_3$NbS$_4$.

A mixture of two or more of the above-described materials may be used as the positive electrode active material used in this embodiment.

Subsequently, the exterior body 509 is folded along a portion shown by a dashed line, as illustrated in FIG. 11C. Then, the outer edges of the exterior body 509 are bonded to each other. The bonding can be performed by thermocompression, for example. At this time, an unbonded region (hereinafter referred to as an inlet) is provided for part (or one side) of the exterior body 509 so that an electrolyte solution (also referred to as an electrolyte) 508 can be introduced later.

Next, the electrolyte solution 508 (not illustrated) is introduced into the exterior body 509 from the inlet of the exterior body 509. The electrolyte solution 508 is preferably introduced in a reduced pressure atmosphere or in an inert atmosphere. Lastly, the inlet is sealed by bonding. In this manner, the laminated secondary battery 500 can be manufactured.

This embodiment can be freely combined with the other embodiments.

Embodiment 5

This embodiment describes an example of fabricating a semi-solid-state battery as the low-temperature secondary battery described in Embodiment 1.

Figure 12A:
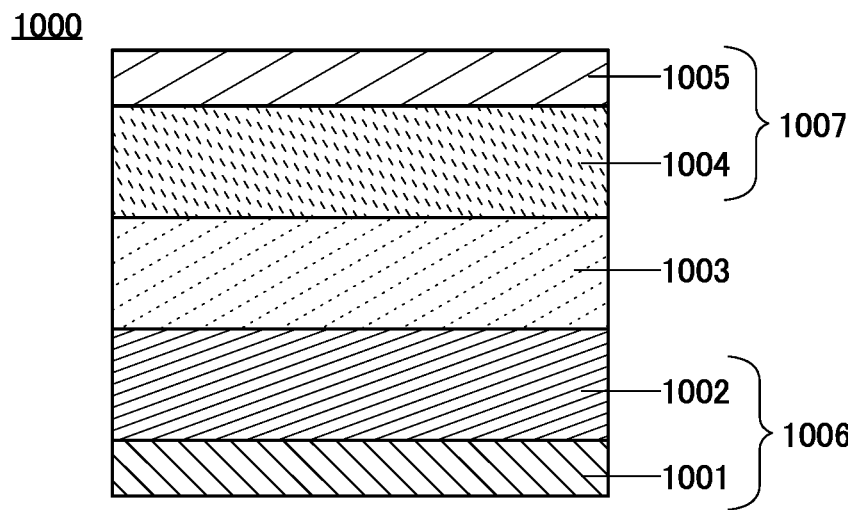
FIG. 12A is a cross-sectional view of a semi-solid-state battery.

FIG. 12A is a schematic cross-sectional view of a secondary battery 1000 of one embodiment of the present invention. The secondary battery 1000 includes a positive electrode 1006, an electrolyte layer 1003, and a negative electrode 1007. The positive electrode 1006 includes a positive electrode current collector 1001 and a positive electrode active material layer 1002. The negative electrode 1007 includes a negative electrode current collector 1005 and a negative electrode active material layer 1004.

Figure 12B:
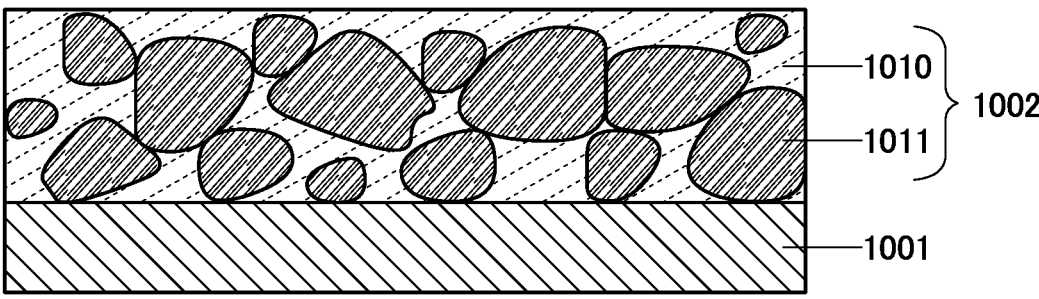
FIG. 12B is a cross-sectional view of a positive electrode.

FIG. 12B is a schematic cross-sectional view of the positive electrode 1006. The positive electrode active material layer 1002 of the positive electrode 1006 contains a positive electrode active material 1011, an electrolyte 1010, and a conductive material (also referred to as a conductive additive). The electrolyte 1010 contains a lithium-ion conductive polymer and a lithium salt. It is preferable that the positive electrode active material layer 1002 do not contain a binder.

Figure 12C:
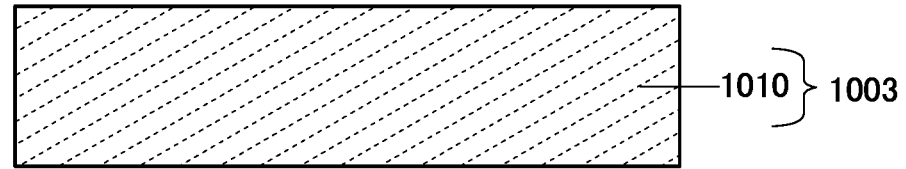
FIG. 12C is a cross-sectional view of an electrolyte.

FIG. 12C is a schematic cross-sectional view of the electrolyte layer 1003. The electrolyte layer 1003 contains the electrolyte 1010 containing a lithium-ion conductive polymer and a lithium salt.

In this specification and the like, the lithium-ion conductive polymer refers to a polymer having conductivity of cations such as lithium. More specifically, the lithium-ion conductive polymer is a high molecular compound including a polar group to which cations can coordinate. The polar group is preferably an ether group, an ester group, a nitrile group, a carbonyl group, siloxane, or the like.

As the lithium-ion conductive polymer, for example, polyethylene oxide (PEO), a derivative containing polyethylene oxide as its main chain, polypropylene oxide, polyacrylic acid ester, polymethacrylic acid ester, polysiloxane, polyphosphazene, or the like can be used.

The lithium-ion conductive polymer may have a branched or cross-linking structure. Alternatively, the lithium-ion conductive polymer may be a copolymer. The molecular weight is preferably greater than or equal to ten thousand, further preferably greater than or equal to hundred thousand, for example.

In the lithium-ion conductive polymer, lithium ions move by changing polar groups to interact with, due to the local motion (also referred to as segmental motion) of polymer chains. In PEO, for example, lithium ions move by changing oxygen to interact with, due to the segmental motion of ether chains. When the temperature is close to or higher than the melting point or softening point of the lithium-ion conductive polymer, the crystal regions are broken to increase amorphous regions, so that the motion of the ether chains becomes active and the ion conductivity increases. Thus, in the case where PEO is used as the lithium-ion conductive polymer, charging and discharging are preferably performed at higher than or equal to 60° C.

According to the ionic radius of Shannon (Shannon et al., Acta A 32 (1976) 751.), the radius of a monovalent lithium ion is 0.590 Å in the case of tetracoordination, 0.76 Å in the case of hexacoordination, and 0.92 Å in the case of octa-coordination. The radius of a bivalent oxygen ion is 1.35 Å in the case of bicoordination, 1.36 Å in the case of tricoor-dination, 1.38 Å in the case of tetracorrdination, 1.40 Å in the case of hexacoordination, and 1.42 Å in the case of octacoordination. The distance between polar groups included in adjacent lithium-ion conductive polymer chains is preferably greater than or equal to the distance that allows lithium ions and anion ions contained in the polar groups to exist stably while the above ionic radius is maintained. Furthermore, the distance between the polar groups is pref-erably close enough to cause interaction between the lithium ions and the polar groups. Note that the distance is not necessarily always kept constant because the segmental motion occurs as described above. The distance needs to be appropriate only when lithium ions are transferred.

As the lithium salt, it is possible to use a compound containing lithium and at least one or more of phosphorus, fluorine, nitrogen, sulfur, oxygen, chlorine, arsenic, boron, aluminum, bromine, and iodine. For example, one of lithium salts such as $LiPF_6$, $LiN(FSO_2)_2$ (lithium bis(fluorosulfonyl) imide, LiFSI), $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and lithium bis(oxalate)borate (LiBOB) can be used, or two or more of these lithium salts can be used in an appropriate combination in an appropriate ratio.

It is particularly preferable to use LiFSI because favorable characteristics at low temperatures can be obtained. Note that LiFSI and LiTFSA are less likely to react with water than $LiPF_6$ or the like. This can relax the dew point control in fabricating an electrode and an electrolyte layer that use LiFSI. For example, the fabrication can be performed even in a normal air atmosphere, not only in an inert atmosphere in which moisture is excluded as much as possible or in a dry room in which a dew point is controlled. This is preferable because the productivity can be improved. When the seg-mental motion of ether chains is used for lithium conduction, it is particularly preferable to use a Li salt that is highly dissociable and has a plasticizing effect, such as LiFSI or LiTFSA, in which case the operating temperature range can be wide.

In this specification and the like, a binder refers to a high molecular compound mixed only for binding an active material, a conductive material, and the like onto a current collector. A binder refers to, for example, a rubber material such as poly vinylidene difluoride (PVDF), styrene-butadi-ene rubber (SBR), styrene-isoprene-styrene rubber, butadi-ene rubber, or ethylene-propylene-diene copolymer; or a material such as fluorine rubber, polystyrene, polyvinyl chloride, polytetrafluoroethylene, polyethylene, polypropyl-ene, polyisobutylene, or ethylene-propylene-diene polymer.

Since the lithium-ion conductive polymer is a high molecular compound, the positive electrode active material 1011 and the conductive material can be bound onto the positive electrode current collector 1001 when the lithium-ion conductive polymer is sufficiently mixed in the positive electrode active material layer 1002. Thus, the positive electrode 1006 can be fabricated without a binder. A binder is a material that does not contribute to charge and discharge reactions. Thus, a smaller number of binders enable higher proportion of materials that contribute to charging and discharging, such as an active material and an electrolyte. As a result, the secondary battery 1000 can have higher dis-charge capacity, higher rate characteristics, improved cycle performance, and the like.

When the positive electrode active material layer 1002 and the electrolyte layer 1003 both contain the electrolyte 1010, interface contact between the positive electrode active material layer 1002 and the electrolyte layer 1003 can be improved. As a result, the secondary battery 1000 can have higher rate characteristics, higher discharge capacity, improved cycle performance, and the like.

When containing no or extremely little organic solvent, the secondary battery can be less likely to catch fire and ignite and thus can have higher level of safety, which is preferable. When using the electrolyte 1010 containing no or extremely little organic solvent, the electrolyte layer 1003 can have enough strength and thus can electrically insulate the positive electrode from the negative electrode without a separator. Since a separator is not necessary, the secondary battery can have high productivity. When using the electro-lyte 1010 containing an inorganic filler 1015, the secondary battery can have higher strength and higher level of safety.

To obtain the electrolyte 1010 containing no or extremely little organic solvent, the electrolyte 1010 is preferably dried sufficiently. In this specification and the like, the electrolyte 1010 can be regarded as being dried sufficiently when a change in the weight after drying at 90° C. under reduced pressure for one hour is within 5%.

The electrolyte layer 1003 may contain an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile. The concentration of a material to be added is, for example, higher than or equal to 0.1 wt % and lower than or equal to 5 wt % with respect to the whole electrolyte layer 1003.

Note that materials contained in a secondary battery, such as a lithium-ion conductive polymer, a lithium salt, a binder, and an additive agent can be identified using nuclear mag-netic resonance (NMR), for example. Analysis results of Raman spectroscopy, Fourier transform infrared spectros-copy (FT-IR), time-of-flight secondary ion mass spectrom-etry (TOF-SIMS), gas chromatography mass spectroscopy (GC/MS), pyrolysis gas chromatography mass spectroscopy (Py-GC/MS), liquid chromatography mass spectroscopy (LC/MS), or the like can also be used for the identification. Note that analysis by NMR or the like is preferably per-formed after the positive electrode active material layer 1002 is subjected to suspension using a solvent to separate the positive electrode active material 1011 from the other materials.

The positive electrode of this embodiment is not limited to have the cross-section illustrated in FIG. 12B. As an example different from that in FIG. 12B, FIGS. 13A to 13D each illustrate a cross section of a positive electrode.

In the positive electrode of the secondary battery, a binder (a resin) is mixed in order to fix the current collector 550 of metal foil and the active material 551. The binder is also referred to as a binding material. Since the binder is a high molecular material, a large amount of binder lowers the proportion of the active material in the positive electrode, thereby reducing the discharge capacity of the secondary battery. Therefore, the amount of binder mixed is reduced to a minimum. In FIG. 10A, regions not filled with the active material 551 which is a positive electrode active material, the second active material 552, or the acetylene black 553 indicate spaces or binders.

Figure 13A:
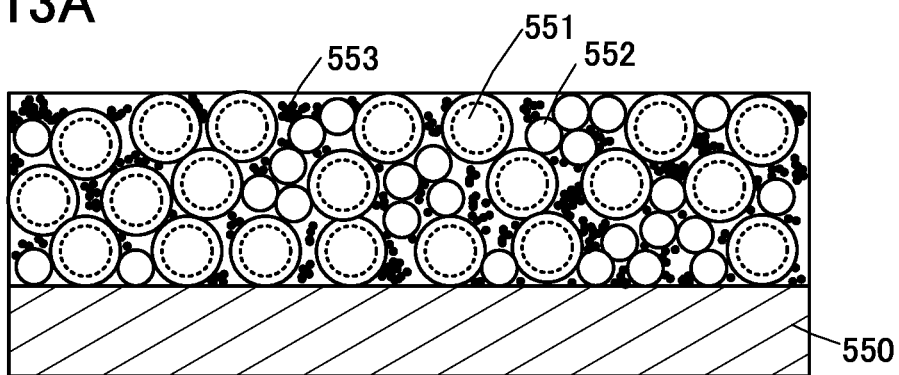
FIG. 13A, FIG. 13B, FIG. 13C, and FIG. 13D are cross-sectional views of positive electrodes.

In FIG. 13A, acetylene black 553 is shown as the conductive agent. FIG. 13A shows an example in which second active materials 552 with a smaller particle diameter than the active material 551 are mixed. The positive electrode in which particles with different particle sizes are mixed can have high density. The active material 551 has a core-shell structure. Note that "core" is used not to indicate a core of the entire particle, but to show the positional relationship between the particle center and outer shell. In addition, "core" can also be referred to as a core material. For example, the active material 551 uses first NCM for its core and second NCM for its shell. A composite oxide represented by $LiNixCoyMnzO_2$ in which x:y:z=8:1:1 or x:y:z=9: 0.5:0.5 can be used as the first NCM, and a composite oxide represented by $LiNixCoyMnzO_2$ in which x:y:z=1:1:1 can be used as the second NCM. Note that the atomic ratio of the second NCM is not limited to the above ratio. For example, when having a lower nickel proportion than the first NCM, the second NCM might have an effect similar to that of the second NCM having the above ratio.

In FIG. 13A, the boundary between the core region and the shell region of the active material 551 is indicated by a dotted line in the particle 551. Although FIG. 13A shows an example in which the active material 551 has a spherical shape, there is no particular limitation and other various shapes can be employed. The cross-sectional shape of the active material 551 may be an ellipse, a rectangle, a trapezoid, a pyramid, a quadrilateral with rounded corners, or an asymmetrical shape.

Figure 13B:
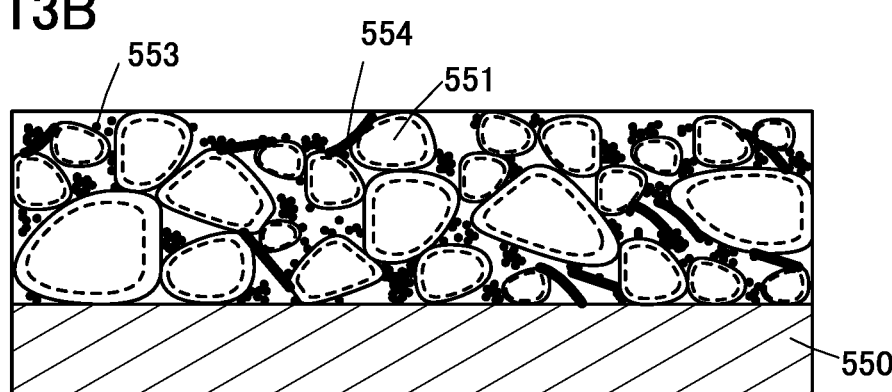

FIG. 13B shows an example in which the active materials 551 have various shapes. FIG. 13B shows the example different from that in FIG. 13A.

In the positive electrode in FIG. 13B, graphene 554 is used as a carbon material used as the conductive agent.

Graphene, which has electrically, mechanically, or chemically remarkable characteristics, is a carbon material that is expected to be applied to a variety of fields, such as field-effect transistors or solar batteries.

In FIG. 13B, a positive electrode active material layer containing the active material 551, the graphene 554, and the acetylene black 553 is formed over the current collector 550.

In the step of mixing the graphene 554 and the acetylene black 553 to obtain an electrode slurry, the weight of mixed carbon black is preferably 1.5 times to 20 times, further preferably 2 times to 9.5 times the weight of graphene.

When the graphene 554 and the acetylene black 553 are mixed in the above ratio range, the acetylene black 553 can be dispersed uniformly and less likely to be aggregated at the time of preparing the slurry. Furthermore, when the graphene 554 and the acetylene black 553 are mixed in the above ratio range, the positive electrode density can be higher than that of an electrode using only the acetylene black 553 as a conductive agent. As the electrode density is higher, the capacity per unit weight can be higher. Specifically, the density of the positive electrode active material layer measured by gravimetry can be higher than 3.5 g/cc. In addition, it is preferable that the active material 551 be used for the positive electrode and the graphene 554 and the acetylene black 553 be mixed in the above ratio range, in which case synergy for higher capacity of the secondary battery can be expected.

The above features are advantageous for secondary batteries for vehicles.

When a vehicle increases in weight with increasing number of secondary batteries, more energy is consumed to move the vehicle, which decreases the mileage. Even when the weight of the secondary batteries incorporated in the vehicle is unchanged, using high-density secondary batteries can maintain the mileage of the vehicle with almost no increase in the total weight of the vehicle.

Since electric power is needed to charge the secondary battery with higher capacity in the vehicle, the charging is desirably finished in a short time. What is called a regenerative charging, in which electric power is temporarily generated when the vehicle is braked and the electric power is used for charging, is performed under high rate charging conditions; thus, a secondary battery for a vehicle is desired to have favorable rate characteristics.

Using the active material 551 for the positive electrode and mixing acetylene black and graphene within an optimal range enable both higher electrode density and formation of an appropriate space needed for ion conduction, whereby a secondary battery for a vehicle which has high energy density and favorable output characteristics can be obtained.

In FIG. 13B, the boundary between the core region and the shell region of the active material 551 is indicated by a dotted line in the active material 551. In FIG. 13B, a region that is not filled with the active material 551, the graphene 554, or the acetylene black 553 represents a space or the binder. A space is required for the solvent to penetrate the positive electrode; too many spaces lower the electrode density, too few spaces do not allow the solvent to penetrate the positive electrode, and a space that remains after the secondary battery is completed lowers the efficiency.

Using the active material 551 for the positive electrode and mixing acetylene black and graphene within an optimal range enable both higher electrode density and formation of an appropriate space needed for ion conduction, whereby a secondary battery which has high energy density and favorable output characteristics can be obtained.

Figure 13C:
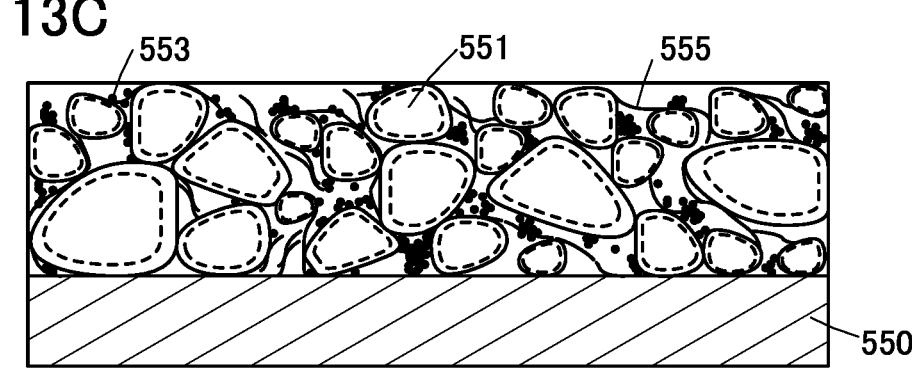

FIG. 13C shows an example of a positive electrode in which a carbon nanotube 555 is used instead of graphene. FIG. 13C shows the example different from that in FIG. 13B. With the use of the carbon nanotube 555, aggregation of the acetylene black 553 which is a kind of carbon black can be prevented and the dispersibility can be increased.

In FIG. 13C, a region that is not filled with the active material 551, the carbon nanotube 555, or the acetylene black 553 represents a space or the binder.

Figure 13D:
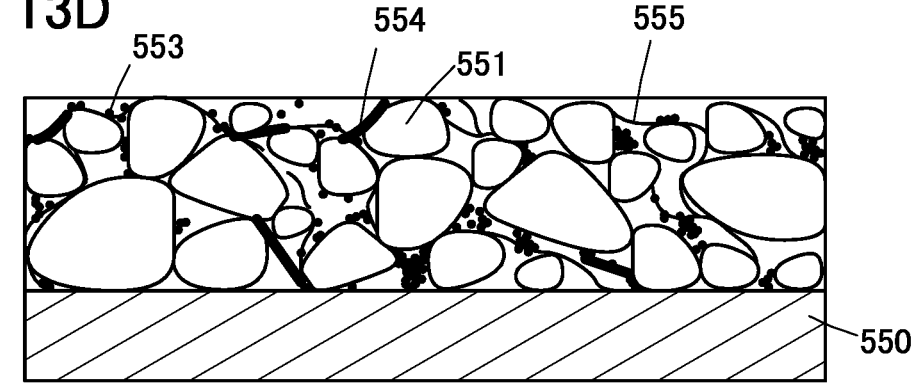

FIG. 13D shows another example of a positive electrode. In the example illustrated in FIG. 13D, the active material 551 does not have the core shell structure. In the example shown in FIG. 13D, the carbon nanotube 555 is used in addition to the graphene 554. With the use of both the graphene 554 and the carbon nanotube 555, aggregation of the acetylene black 553 which is a kind of carbon black can be prevented and the dispersibility can be further increased.

In FIG. 10D, a region that is not filled with the active material 551, the carbon nanotube 555, the graphene 554, or the acetylene black 553 represents a space or the binder.

A semi-solid-state secondary battery can be fabricated in the following manner: the electrolyte 1010 is provided over any one of the positive electrodes in FIG. 13A, FIG. 13B, FIG. 13C, and FIG. 13D, a negative electrode is provided over the electrolyte 1010, and the obtained stack is stored in a container (an exterior body or a metal can).

Although the structure example of a semi-solid-state secondary battery is described above, there is no particular limitation and a solvent can be used for the secondary battery. A secondary battery using a solvent can be fabricated in the following manner: a separator is provided over a positive electrode, a negative electrode is provided over the separator, the obtained stack is stored in a container (an exterior body or a metal can), and the container is filled with the solvent.

In this specification and the like, a polymer electrolyte secondary battery refers to a secondary battery in which an electrolyte layer between a positive electrode and a negative electrode contains a polymer. Polymer electrolyte secondary batteries include a dry (or intrinsic) polymer electrolyte battery and a polymer gel electrolyte battery. A polymer electrolyte secondary battery may be referred to as a semi-solid-state battery.

A semi-solid-state battery fabricated using the active material 551 is a secondary battery having high charge and discharge capacity. The semi-solid-state battery can have high charge and discharge voltage. Alternatively, a highly safe or highly reliable semi-solid-state battery can be achieved.

This embodiment can be freely combined with any of the other embodiments.

Embodiment 6

In this embodiment, examples of providing vehicles, moving objects, and the like with the control system for a secondary battery of one embodiment of the present invention will be described.

Figure 14A:
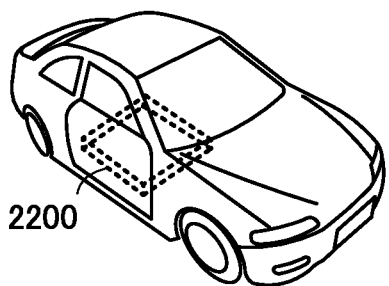
FIG. 14A is a view illustrating an example of an electric vehicle.

Examples of an electric vehicle using one embodiment of the present invention are illustrated in FIG. 14A, FIG. 14B, FIG. 14C, and FIG. 14D. An automobile 2001 illustrated in FIG. 14A is an electric vehicle that runs on an electric motor as a power source. Alternatively, the automobile 2001 is a hybrid electric vehicle that can appropriately select an electric motor or an engine as a driving power source. In the case where the secondary battery is mounted on the vehicle, In the case where a vehicle uses a secondary battery, the low-temperature secondary battery, the temperature sensor, and the heater that are described in Embodiment 1 are provided. In addition, using the semi-solid-state secondary battery described in Embodiment 5 can create synergy for higher safety. The automobile 2001 illustrated in FIG. 14A includes a battery pack 2200, and the battery pack includes a secondary battery module in which a plurality of secondary batteries are connected to each other. Moreover, the battery pack preferably includes a temperature control system for a secondary battery that is electrically connected to the secondary battery module. The low-temperature secondary battery is prepared as an auxiliary power source and the heating means heating some of the secondary batteries as the main power sources is provided, whereby the control system for a secondary battery which is less affected by the ambient temperature can be mounted on the automobile 2001.

The automobile 2001 can be charged when the secondary battery of the automobile 2001 receives electric power from an external charging equipment through a plug-in system, a contactless charging system, or the like. In charging, a given method such as CHAdeMO (registered trademark) or Combined Charging System may be employed as a charging method, the standard of a connector, or the like as appropriate. The secondary battery may be a charging station provided in a commerce facility or a household power supply. For example, a plug-in technique enables an exterior power supply to charge the low-temperature secondary battery and the secondary battery incorporated in the automobile 2001. Charging can be performed by converting AC power into DC power through a converter such as an ACDC converter.

Although not illustrated, the vehicle can include a power receiving device so as to be charged by being supplied with power from an above-ground power transmitting device in a contactless manner. For the contactless power feeding system, by fitting a power transmitting device in a road or an exterior wall, charging can be performed not only when the vehicle is stopped but also when driven. In addition, the contactless power feeding system may be utilized to perform transmission and reception of electric power between two vehicles. Furthermore, a solar cell may be provided in the exterior of the vehicle to charge the secondary battery when the vehicle stops or moves. To supply power in such a contactless manner, an electromagnetic induction method or a magnetic resonance method can be used.

Figure 14B:
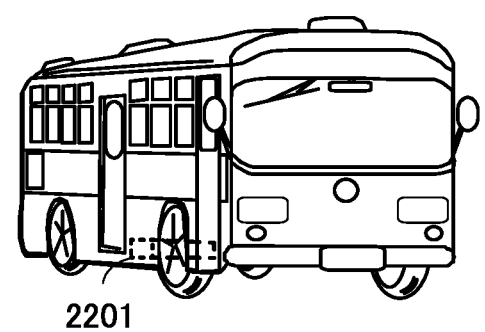
FIG. 14B and FIG. 14C are views illustrating examples of transport vehicles.

FIG. 14B shows a large transporter 2002 having a motor controlled by electric power, as an example of a transport vehicle. The secondary battery module of the transporter 2002 has a cell unit of four secondary batteries with 3.5 V or more and 4.7 V or lower, and 48 cells are connected in series to have 170 V as the maximum voltage. A battery pack 2201 has the same function as that in FIG. 14A except that the number of secondary batteries forming the secondary battery module of the battery pack 2201 is different; thus the description is omitted. The low-temperature secondary battery is prepared as an auxiliary power source and the heating means heating some of the secondary batteries as the main power sources is provided, whereby the control system for a secondary battery which is less affected by the ambient temperature can be mounted on the large transporter 2002.

Figure 14C:
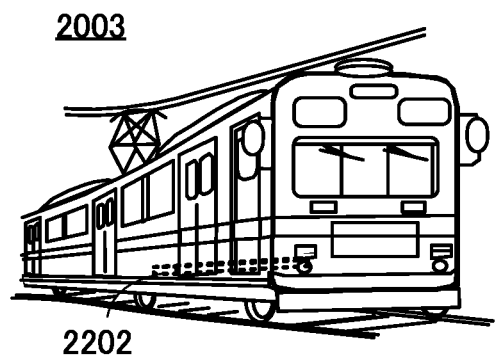

FIG. 14C shows a large transportation vehicle 2003 having a motor controlled by electricity as an example. The secondary battery module of the transportation vehicle 2003 has more than 100 secondary batteries with 3.5 V or more and 4.7 V or lower connected in series, and the maximum voltage is 600 V, for example. Thus, the secondary batteries are required to have few variations in the characteristics. A battery pack 2202 has the same function as that in FIG. 14A except that the number of secondary batteries forming the secondary battery module of the battery pack 2202 is different; thus the detailed description is omitted. The low-temperature secondary battery is prepared as an auxiliary power source and the heating means heating some of the secondary batteries as the main power sources is provided, whereby the control system for a secondary battery which is less affected by the ambient temperature can be mounted on the large transporter 2003.

Figure 14D:
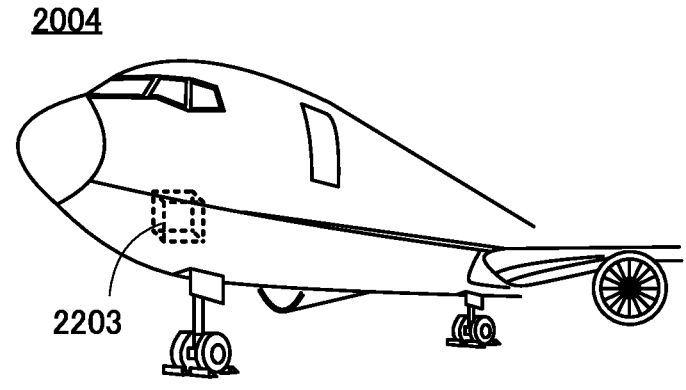
FIG. 14D is a view illustrating an example of an airplane.

FIG. 14D shows an aircraft 2004 having a combustion engine as an example. The aircraft 2004 shown in FIG. 14D can be regarded as a portion of a transportation vehicle since it is provided with wheels for takeoff and landing, and has a battery pack 2203 including a secondary battery module and a charging control device; the secondary battery module includes a plurality of connected secondary batteries. The aircraft 2004 incorporates the low-temperature secondary battery, the temperature sensor, and the heater that are described in Embodiment 2.

The secondary battery module of the aircraft 2004 has eight 4 V secondary batteries connected in series, which has the maximum voltage of 32 V, for example. A battery pack 2203 has the same function as that in FIG. 14A except that the number of secondary batteries forming the secondary battery module of the battery pack 2203 is different; thus the detailed description is omitted. The low-temperature secondary battery is prepared as an auxiliary power source and the heating means heating some of the secondary batteries as the main power sources is provided, whereby the control system for a secondary battery which is less affected by the ambient temperature can be mounted on the aircraft 2004.

This embodiment can be freely combined with any of the other embodiments.

REFERENCE NUMERALS

10: low-temperature secondary battery, 11a: secondary battery, 11b: secondary battery, 11c: secondary battery, 11d: secondary battery, 11e: secondary battery, 101: low-temperature secondary battery. 102a: secondary battery, 102b: secondary battery, 102c: secondary battery, 102d: secondary battery, 102e: secondary battery, 103a: switch, 103b: switch, 103c: switch, 103d: switch, 103e: switch, 150a: heater, 150b: heater, 150c: heater, 150d: heater, 150e: heater, 401: low-temperature secondary battery. 402a: secondary battery, 402n: secondary battery, 403a: switch, 403b: switch, 403c: switch, 403n: switch, 405a: temperature sensor, 405b: temperature sensor, 405n: temperature sensor, 406a: monitor circuit. 406b: monitor circuit. 406n: monitor circuit. 450a: heater, 450b: heater, 450n: heater, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 510: positive electrode lead electrode, 511: negative electrode lead electrode, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 615: module, 616: wiring, 617: heater, 911a: terminal, 911b: terminal, 913: secondary battery, 930: housing, 930a: housing, 930b: housing, 931: negative electrode, 931a: negative electrode active material layer, 932: positive electrode, 932a: positive electrode active material layer, 933: separator, 950: wound body, 950a: wound body, 951: terminal, 952: terminal, 1000: secondary battery, 1001: positive electrode current collector, 1002: positive electrode active material layer, 1003: electrolyte layer, 1004: negative electrode active material layer, 1005: negative electrode current collector, 1006: positive electrode, 1007: negative electrode, 10100: electrolyte, 1011: positive electrode active material, 1015: inorganic filler, 1301a: secondary battery, 1301b: secondary battery, 1302: control circuit, 1303: motor controller, 1304: motor, 1305: gear, 1306: DCDC circuit, 1307: electric power steering, 1308a: heater, 1308b: heater, 1309: defogger, 1310: DCDC circuit, 1311: secondary battery, 1312: inverter, 1313: audio, 1314: power window, 1315: lamps, 1316: tire, 1317: rear motor, 1320a: monitor circuit, 1320b: monitor circuit, 1321: monitor portion, 1322: switch, 1324: switch.

The invention claimed is:

1. A vehicle comprising:
a first lithium-ion secondary battery having an operating temperature range that is a first temperature range;

a second lithium-ion secondary battery having an operating temperature range that is a second temperature range comprising an upper limit of the first temperature range;
a third lithium-ion secondary battery having an operating temperature range that is the second temperature range;
a first temperature sensor sensing a temperature of the second lithium-ion secondary battery;
a second temperature sensor sensing a temperature of the third lithium-ion secondary battery; and
a control circuit,
wherein the first lithium-ion secondary battery is not electrically connected to the second lithium-ion secondary battery and the third lithium-ion secondary battery,
wherein a lower limit of the first temperature range is lower than a lower limit of the second temperature range, and
wherein the control circuit is configured:
to stop charging and discharging of the second lithium-ion battery and to bring the temperature of the second lithium-ion secondary battery within the second temperature range by heating with self-heating of the first lithium-ion secondary battery when a temperature of the first temperature sensor is lower than the lower limit of the second temperature range; and
to stop charging and discharging of the third lithium-ion battery and to bring the temperature of the third lithium-ion secondary battery within the second temperature range by using the second lithium-ion secondary battery as a power source for heating of the third lithium-ion secondary battery when a temperature of the first temperature sensor is within the second temperature range and a temperature of the second temperature sensor is lower than the lower limit of the second temperature range.

2. The vehicle according to claim 1,
wherein the lower limit of the first temperature range is at least lower than 25° C. and an upper limit of the second temperature range is at least higher than the first temperature range.

3. A control system for a secondary battery, comprising:
a first lithium-ion secondary battery;
a second lithium-ion secondary battery having a first operating temperature range different from an operating temperature range of the first lithium-ion secondary battery;
a third lithium-ion secondary battery having the first operating temperature range;
a first heater heating the second lithium-ion secondary battery;
a second heater heating the third lithium-ion secondary battery;
a first monitor circuit monitoring a voltage and a temperature of the second lithium-ion secondary battery;
a second monitor circuit monitoring a voltage and a temperature of the third lithium-ion secondary battery;
a control circuit electrically connected to the monitor circuit;
a first switch between the first heater and the first lithium-ion secondary battery; and
a second switch between the second heater and the second lithium-ion secondary battery,
wherein each of the first switch and the second switch is controlled by the control circuit.

4. The control system for a secondary battery, according to claim 3, wherein the monitor circuit or the control circuit comprises a protective circuit.

5. A vehicle comprising:

a first lithium-ion secondary battery having an operating temperature range that is a first temperature range;

a second lithium-ion secondary battery having an operating temperature range that is a second temperature range comprising an upper limit of the first temperature range;

a third lithium-ion secondary battery having an operating temperature range that is the second temperature range;

a first temperature sensor sensing a temperature of the second lithium-ion secondary battery;

a second temperature sensor sensing a temperature of the third lithium-ion secondary battery;

a first heater heating the second lithium-ion secondary battery;

a second heater heating the third lithium-ion secondary battery; and a control circuit, wherein the first lithium-ion secondary battery is not electrically connected to the second lithium-ion secondary battery and the third lithium-ion secondary battery, wherein the first heater is electrically connected to the first lithium-ion secondary battery, wherein the second heater is electrically connected to the second lithium-ion secondary battery, wherein a lower limit of the first temperature range is lower than a lower limit of the second temperature range, and wherein the control circuit is configured:

to bring the temperature of the second lithium-ion secondary battery within the second temperature range by heating with the first heater using the first lithium-ion secondary battery as a power source when a temperature of the first temperature sensor is lower than the lower limit of the second temperature range; and to bring the temperature of the third lithium-ion secondary battery within the second temperature range by heating with the second heater using the second lithium-ion secondary battery as a power source when a temperature of the first temperature sensor is within the second temperature range and a temperature of the second temperature sensor is lower than the lower limit of the second temperature range.

6. The vehicle according to claim 5, wherein the lower limit of the first temperature range is at least lower than 25° C. and an upper limit of the second temperature range is at least higher than the first temperature range.

7. The vehicle according to claim 1, wherein a melting point of an electrolyte of the first lithium-ion secondary battery is lower than or equal to −40° C. and at least a main component of the electrolyte of the first lithium-ion secondary battery comprises a component with a melting point lower than or equal to −40° C.

8. The vehicle according to claim 1, wherein a viscosity of an electrolyte of the second lithium-ion secondary battery is lower than a viscosity of the electrolyte of the first lithium-ion secondary battery.

9. A vehicle comprising the control system for a secondary battery according to claim 3, wherein a melting point of an electrolyte of the first lithium-ion secondary battery is lower than or equal to −40° C. and at least a main component of the electrolyte of the first lithium-ion secondary battery comprises a component with a melting point lower than or equal to −40° C.

10. A vehicle comprising the control system for a secondary battery according to claim 3, wherein a viscosity of an electrolyte of the second lithium-ion secondary battery is lower than a viscosity of the electrolyte of the first lithium-ion secondary battery.

11. The vehicle according to claim 5, wherein a melting point of an electrolyte of the first lithium-ion secondary battery is lower than or equal to −40° C. and at least a main component of the electrolyte of the first lithium-ion secondary battery comprises a component with a melting point lower than or equal to −40° C.

12. The vehicle according to claim 5, wherein a viscosity of an electrolyte of the second lithium-ion secondary battery is lower than a viscosity of the electrolyte of the first lithium-ion secondary battery.

* * * * *